United States Patent
Tsubaki et al.

(10) Patent No.: US 7,664,296 B2
(45) Date of Patent: Feb. 16, 2010

(54) IMAGE RECORDING METHOD AND SYSTEM, IMAGE TRANSMITTING METHOD, AND IMAGE RECORDING APPARATUS

(75) Inventors: Hisayoshi Tsubaki, Asaka (JP); Mikio Watanabe, Asaka (JP); Hiroshi Tanaka, Asaka (JP)

(73) Assignee: Fujifilm Corporation, Minato-ku, Tokyo (JP)

( * ) Notice: Subject to any disclaimer, the term of this patent is extended or adjusted under 35 U.S.C. 154(b) by 730 days.

(21) Appl. No.: 10/058,924

(22) Filed: Jan. 30, 2002

(65) Prior Publication Data

US 2002/0101619 A1    Aug. 1, 2002

(30) Foreign Application Priority Data

Jan. 31, 2001  (JP)  ............................. 2001-024288
Mar. 9, 2001   (JP)  ............................. 2001-067124

(51) Int. Cl.
    *G06K 9/00*  (2006.01)
(52) U.S. Cl. .................. 382/118; 382/115; 382/100
(58) Field of Classification Search ............. 382/115, 382/118; 396/2, 57; 348/231.3, 231.5, 231.6, 348/207.1, 522
    See application file for complete search history.

(56) References Cited

U.S. PATENT DOCUMENTS

| 4,768,099 | A | * | 8/1988 | Mukai | 358/403 |
| 4,992,887 | A | * | 2/1991 | Aragaki | 358/403 |
| 5,307,297 | A | * | 4/1994 | Iguchi et al. | 345/169 |
| 5,334,823 | A | * | 8/1994 | Noblett et al. | 235/380 |
| 5,412,727 | A | * | 5/1995 | Drexler et al. | 713/186 |
| 5,467,403 | A | * | 11/1995 | Fishbine et al. | 382/116 |
| 5,579,393 | A | * | 11/1996 | Conner et al. | 713/176 |
| 5,724,155 | A | * | 3/1998 | Saito | 358/402 |
| 5,737,491 | A | * | 4/1998 | Allen et al. | 704/270 |
| 5,865,745 | A | * | 2/1999 | Schmitt et al. | 600/407 |

(Continued)

FOREIGN PATENT DOCUMENTS

JP          9-248296          9/1997

(Continued)

OTHER PUBLICATIONS

Hamilton, Eric, JPEG File Interchange Format Version 1.02, Sep. 1, 1992, http://www.w3.org/Graphics/JPEG/jfif3.pdf.*

(Continued)

*Primary Examiner*—Sath V Perungavoor
(74) *Attorney, Agent, or Firm*—McGinn IP Law Group, PLLC

(57) ABSTRACT

An input apparatus reads a patient ID from an ID card and transmits it to a computer. On the basis of the patient ID, the computer obtains corresponding patient information containing a photograph of the patient's face and the patient's name, from a medical database, and then transmits the patient information to the digital camera together with the patient ID. The digital camera displays the patient information to enable confirmation of the patient to be photographed. After the patient has been confirmed, the patient ID is filled in a header part of an image file for the image photographed using the digital camera, and the image file is transmitted to the medical database or the like. Thus, the input of the identification information input before photographing and the subject to be photographed can be easily confirmed.

12 Claims, 23 Drawing Sheets

U.S. PATENT DOCUMENTS

| | | | | |
|---|---|---|---|---|
| 5,920,317 | A * | 7/1999 | McDonald | 715/853 |
| 5,960,155 | A * | 9/1999 | Fukuoka et al. | 386/117 |
| 6,023,241 | A * | 2/2000 | Clapper | 342/357.13 |
| 6,038,012 | A * | 3/2000 | Bley | 355/40 |
| 6,038,333 | A * | 3/2000 | Wang | 382/118 |
| 6,040,783 | A * | 3/2000 | Houvener et al. | 340/5.53 |
| 6,128,398 | A * | 10/2000 | Kuperstein et al. | 382/118 |
| 6,381,348 | B2 * | 4/2002 | Takeo | 382/128 |
| 6,535,243 | B1 * | 3/2003 | Tullis | 348/207.1 |
| 6,542,627 | B1 * | 4/2003 | Kawata | 382/128 |
| 6,633,223 | B1 * | 10/2003 | Schenker et al. | 340/5.53 |
| 2002/0036565 | A1 * | 3/2002 | Monroe | 340/425.5 |
| 2002/0152390 | A1 * | 10/2002 | Furuyama et al. | 713/185 |
| 2007/0047770 | A1 * | 3/2007 | Swope et al. | 382/115 |

FOREIGN PATENT DOCUMENTS

| | | |
|---|---|---|
| JP | 9-275542 | 10/1997 |
| JP | 10-56610 | 2/1998 |
| JP | 10-065889 | 3/1998 |
| JP | 11-183996 | 7/1999 |
| JP | 2000-165724 | 6/2000 |
| JP | 2000-262505 | 9/2000 |
| JP | 2000-350087 | 12/2000 |
| JP | 2001-008901 | 1/2001 |
| JP | 2001-014277 | 1/2001 |
| JP | 2001-061089 | 3/2001 |
| JP | 2002-232761 | 8/2002 |

OTHER PUBLICATIONS

Core bibliographic information in the TIFF header, http://gdz.sub.uni-goettingen.de/en-old/tech_notes/tiffheader.html.*

Japanese Office Action dated Jul. 19, 2006 with English Translation thereof.

Notification of Reasons for Rejection dated Jan. 28, 2008 with an English translation.

Notification of Reasons for Rejection dated Sep. 17, 2008 with English translation.

Japanese Office Action dated May 2, 2008 with an English translation.

Japanese Office Action dated Aug. 31, 2009 with an English translation.

* cited by examiner

FIG.3

| ID | NAME | DISEASE NAME | HOSPITALIZED DATE | IMAGE POSITION | PHOTOGRAPH OF FACE | PHOTOGRAPH OF AFFECTED PART |
|---|---|---|---|---|---|---|
| 12345 | FUJI TARO | APPENDICITIS | 2000.12.19 | D:¥12345 | DSCF0001.JPG | DSCF0002.JPG<br>DSCF0003.JPG<br>DSCF0004.JPG |
| 67890 | FUJI YOKO | LEUKEMIA | 2000.12.20 | D:¥67890 | DSCF0001.JPG | DSCF0002.JPG<br>DSCF0003.JPG<br>DSCF0004.JPG<br>DSCF0005.JPG |
| ... | ... | ... | ... | ... | ... | ... |

FIG.6

| SOI | Start of Image |
| --- | --- |
| APP1 | Application Marker |
| DOT | QUANTIZATION TABLE |
| DHT | HUFFMAN TABLE |
| SOF | Start of frame |
| SOS | Start of scan |
| IMAGE DATA | JPEG IMAGE DATA |
| EOI | End of Image |

FIG.9

| RECORDED HEADER NAME | RECORDED VALUE |
|---|---|
| Name | FUJI TARO |
| Mobile-Phone | 090-1111-2222 |
| PPP-TEL | 03-1111-2222 |
| PPP-Account | FUJI |
| PPP-Password | abcdefg |
| e-mail | abcd@fujifilm.co.jp |
| Mail-Server | server.fujifilm.co.jp |
| Mail-Account | FUJI |
| Mail-Password | hijklm |
| FTP-Server | ftp://ftp.fujifilm.co.jp/fuji/ |
| FTP-Account | FUJI |
| FTP-Password | opqrstu |
| Printer | ColorPrinter-1 |

FIG.16
ADDED-TO-IMAGE INFORMATION
(Tag INFORMATION)
| PHOTOGRAPHED DATE : 2000/12/14/10:15:00 |
| LATITUDE(DEGREE) : N35 |
| LATITUDE(MINUTE) : 41 |
| LATITUDE(SECOND) : 26.7 |
| LONGITUDE(DEGREE) : E139 |
| LONGITUDE(MINUTE) : 45 |
| LONGITUDE(SECOND) : 18.6 |
| ALTITUDE : 15 |
| •••• |
THUMBNAIL 
MAIN IMAGE
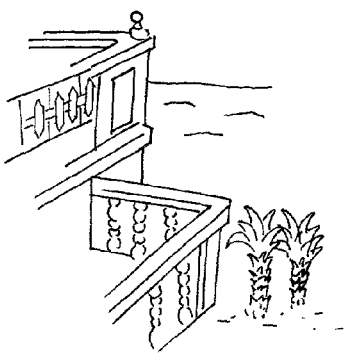

FIG.17

SETUP

DATE/TIME : 99/12/14   12:00:00

PHOTOGRAPHING MODE : FINE  NORMAL  ECONOMY

NUMBER OF PIXELS : VGA(640×480)  XGA(1024×768)

AUTO OFF : 2min

LOCATIONAL INFORMATION : HARUMI

FIG.18

SETUP

DATE/TIME : 99/12/14   12:00:00

PHOTOGRAPHING MODE : FINE  NORMAL  ECONOMY

NUMBER OF PIXELS : VGA(640×480)  XGA(1024×768)

AUTO OFF : 2min

LOCATIONAL INFORMATION : ODAIBA

SETUP

DATE/TIME : 99/12/14  12:00:00

PHOTOGRAPHING MODE : FINE  NORMAL  ECONOMY

NUMBER OF PIXELS : VGA(640×480)  XGA(1024×768)

PATIENT ID : 200102081001

IMAGE RECORDING METHOD AND SYSTEM, IMAGE TRANSMITTING METHOD, AND IMAGE RECORDING APPARATUS

BACKGROUND OF THE INVENTION

1. Field of the Invention

The present invention relates to an image recording method, an image transmitting method, and an image recording apparatus, and in particular, to an image recording method, an image transmitting method, and an image recording apparatus wherein identification information identifying a subject is recorded in connection with the subject, as well as an image recording method and apparatus which records added-to-image information in connection with an image of a subject.

2. Description of the Related Art

Conventional medical systems introduced into hospitals have identification information on patients (patient IDs) and the patients' diagnosis images or case records relatedly recorded in a database so that the diagnosis images can be read out from the database for use as required.

On the other hand, an image photographed using a digital camera is associated with a patient ID in the following manner:

1) The patient ID (number) and the diagnosis image are photographed in connection with each other. Then, the photographed image is associated with the patient ID.

2) The patient ID is input from a keyboard connected to the digital camera, and a folder identical to that for the patient ID is created so that a photographed image is recorded in this folder.

The method 1) is cumbersome because it requires extra operations of photographing the patient ID and associating the photographed image with the patient ID.

On the other hand, in the method 2), an operator manually inputs the patient ID, so that an input error is likely to occur, causing the patient to be mistaken for another patient. Further, if an input error occurs, it cannot be easily detected. Furthermore, since the keyboard is connected to the digital camera, it may obstruct the movement of the camera or a change in camera angle during photographing.

Further, the recorded image is managed on the basis of a directory name or the like, so that if only the image file is copied to another directory or the like, it cannot subsequently be associated with the patient ID.

Furthermore, recent digital cameras allow recorded image information such as image format, the number of pixels, and compression rate to be properly set, so that the image may be mistakenly recorded in a form unsuitable for the database.

An image capturing apparatus has been proposed which loads additional information such as a date or a note from an external device and records it in a recording medium in connection with a photographed image (Japanese Patent Application Publication No. 10-56610).

Further, a large number of cameras have been proposed which record GPS information such as latitude and longitude which is measured using a GPS (Global Positioning System) together with the photographed image.

Furthermore, medical systems that have been introduced into hospitals in recent years relatedly record patients' identification information (patient ID) and the patients' diagnosis images or case records in a database, so that the diagnosis images or case records can be read out from the database as required. However, to associate a photographed image and a patient ID with each other, for example, a patient ID (number) or a board having the patient's name written thereto and a diagnosis image are photographed in connection with each other, and then the patient image is input in connection with the photographed image.

In this regard, the photographer may desire to check what additional information is recorded in connection with the photographed image.

With the additional information such as a date or a note described in Japanese Patent Application Publication No. 10-56610, the photographer can check the contents of the additional information by displaying it on a display of the camera, but this may be impossible depending on the type of the additional information.

For example, the GPS information described in Japanese Patent Application Publication No. 9-275542 comprises numerical values (degree/minute/second) representative of simple latitude and longitude and is accurate as locational information, but cannot be intuitively understood by the photographer even when displayed on the display. Accordingly, it cannot be determined whether or not the GPS information displayed on the display shows the actual photographed location.

Likewise, with the above medical systems, even if a patient ID is displayed on the display of the camera as additional information, it cannot be checked on the basis of the contents of the display whether or not this patient ID matches the patient ID imparted to the patient to be photographed. This results in the need for an extra operation of simultaneously photographing the patient and the patient ID (number) or the like and associating the photographed image with the patient ID. This is cumbersome.

Further, with a large amount of additional information, the restricted display of the camera (for example, a character liquid crystal) does not allow the entire information to be displayed, thereby also preventing the photographer from checking what additional information is added to the image.

SUMMARY OF THE INVENTION

The present invention is provided in view of these circumstances, and it is an object thereof to provide an image recording method and apparatus which can simplify the input of identification information on a subject, which enables an easy check on the correspondence between the subject identification information input before photographing and the subject to be photographed, and which can automatically record information in a format suitable for a database.

It is another object of the present invention to provide an image transmitting method which can simplify the input of information on the destination of an image and which can automatically transmit a photographed image to a destination corresponding to the destination information.

It is yet another object of the present invention to provide an image recording method and system wherein if additional information input from an external device is recorded in connection with an image of the subject, a camera can be used to easily check what added-to-image information is added, whether or not the added-to-image information is correct as information added to the image of the subject, and the like.

To attain these objects, the present invention provides an image recording method characterized by comprising an information loading step of loading identification information on a subject and subject information used by a photographer to confirm the subject, in a digital camera before photographing the subject, a display step of displaying, on the basis of the subject information, subject information on a display device of the digital camera, a photographing step of photographing the subject using the digital camera after confirming the subject on the basis of the display on the display device, and a recording step of recording the photographed image of the subject in connection with the identification information loaded in the information loading step.

That is, the display device of the digital camera displays the subject information on the subject to be photographed, so that before photographing, thereby enabling the subject to be confirmed on the basis of the displayed subject information. In this regard, the photographed image of the subject has his or her identification information recorded thereon in connection therewith. However, the subject identification information and the subject information are on a one-to-one correspondence, so that the subject image confirmed on the basis of the subject information is associated with the subject identification information.

Preferably, the image recorded in connection with the identification information is saved to a database.

Preferably, the information loading step comprises a step of reading the subject identification information from a recording medium having the identification information recorded thereon, a step of reading the subject information corresponding to the read identification information, from the database having the subject information already stored in connection with the subject identification information, and transmitting the subject information read from the database, to the digital camera together with the identification information read from the recording medium.

That is, the identification information and the subject information are automatically loaded in the digital camera by reading the identification information from the recording medium such as a card. Thus, the subject identification information can be easily input, and input errors can be prevented because this invention requires no manual inputs.

Preferably, the step of reading the identification information reads plural pieces of identification information so that these pieces can be accumulated, and the transmitting step transmits the identification information and the subject information in response to an information obtainment request from the digital camera.

Preferably, while the subject identification information and the subject information are being transmitted to the digital camera, the digital camera is inhibited from being used for photographing.

Preferably, the information loading step loads recorded image information containing at least one of image format, the number of pixels, compression rate, file size, and image aspect ratio, and the digital camera records a photographed image on the basis of the loaded recorded image information. Thus, in a digital camera that allows the recorded image information to be properly set, the recorded image information can be automatically set for a format suitable for an image database.

Preferably, the subject information contains at least one of the subject's photograph and name. If the subject is a human being, the photograph shows the subject's face, and the name is this person's.

Preferably, the recording step records the identification information loaded in the information loading step, in a header part of an image file in which the photographed subject image is recorded, thereby associating the identification information with the image.

Further, the present invention provides an image transmitting method characterized by comprising an input step of inputting destination information from an external device to a digital camera, the information being indicative of a destination of an image, a photographing step of photographing a subject using the digital camera, a recording step of recording the photographed image of the subject in connection with the destination information input in the input step, and a transmitting step of transmitting the photographed subject image to the destination corresponding to the destination information, on the basis of the destination information recorded in connection with the image. That is, by loading the image destination information from the external device, the photographed image can be transmitted to the destination indicated by the destination information.

Further, the present invention provides an image recording apparatus characterized by comprising an input device which reads identification information on a subject from a recording medium having the identification recorded thereon, an information transmitting device which reads subject information corresponding to the read identification information, from a database having the subject information already stored in connection with the subject identification information and transmitting the subject information read from the database, together with the identification information read from the recording medium, a receiving device which receives the identification information and the subject information, a display device which displays the subject information on the basis of the received subject information, a photographing device which photographs the subject, and a recording device which records the photographed subject image in connection with the received identification information.

Further, an image recording apparatus according to the present invention is characterized by comprising an input device which reads subject identification information and subject information from a recording medium having the identification information and the subject information recorded thereon, a display device which displays the subject information on the basis of the read subject information, a photographing device which photographs the subject, and a recording device which records the photographed image of the subject in connection with the read identification information.

Preferably, the recording medium is a card, magnetic card, or IC card having a bar code recorded thereon, and the input device is a card reader.

Preferably, the image recording apparatus has a communication device which transmits the image recorded in connection with the identification information, to the database. Further, preferably, the recording device records the identification information in a header part of an image file in which the photographed subject image is recorded.

Further, the present invention provides an image recording method characterized in that added-to-image information added to an image of a subject and display information associated with the added-to-image information are input to a digital camera from an external device, and the digital camera displays the display information on a display device thereof on the basis of the display information input from the external device, and after photographing the subject, records an image of the subject and also records the added-to-image information input from the external device in connection with the image.

That is, the information input from the external device is classified into added-to-image information and display information. The added-to-image information is recorded in connection with an actually photographed image, whereas the display information associated with the added-to-image information is displayed on the display device of the camera. The photographer can check the contents or correctness of the added-to-image information recorded in connection with the image by viewing the display information displayed on the display device of the camera.

Preferably, the added-to-image information contains at least either numerical locational information on the subject or identification information already imparted to the subject. Further, preferably, the display information is used by the photographer to check at least either the contents or correctness of the added-to-image information added to the subject image, and is either text information or image information which can be displayed on the display device.

For example, if the added-to-image information is a numerical value indicative of the location of the subject as in the case with GPS information, the associated display information is a text information such as a place name corresponding to the locational information. Thus, the photographer can understand the locational information added to the subject image on the basis of the place name, and can also determine whether or not this locational information is correct. Further, if the subject is a person and the added-to-image information is identification already added to this person, then the associated display information is indicative of his or her name and a photograph of his or her face. The subject identification information (added-to-image information) and the information (display information) indicative of the subject's name and a photograph of his or her face are on a one-to-one correspondence, so that once the subject is confirmed on the basis of the display information, a subsequently photographed image of the subject and automatically added identification information added to the image are exactly associated with each other.

Preferably, the added-to-image information is binary, and the display information is a text corresponding to the binary information. Further, preferably, the added-to-image information is recorded in a header part of an image file in which an image of the subject is recorded.

Further, the present invention provides an image recording system characterized by comprising an external device which outputs added-to-image information added to an image of a subject and display information associated with the added-to-image information, and a digital camera having a display device which displays the display information on the basis of the display information input from the external device and a recording device which records an image of the subject after the subject has been photographed and records the added-to-image information input from the external device, in connection with the image.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 3 is a view showing an example of various information on patients arranged and managed on the basis of their IDs;

FIG. 6 is a view showing the recorded structure of a JPEG image file;

FIG. 9 is a view showing an example of recorded header names and recorded values in a header part of an image file;

FIG. 16 is a view showing the structure of an image file with added-to-image information attached thereto and which has been received from the car navigation apparatus;

FIG. 17 is a view showing an example of a monitor screen of a camera, displaying display information or the like before positional information is updated;

FIG. 18 is a view showing an example of the monitor screen of the camera, displaying display information or the like after the positional information has been updated;

DETAILED DESCRIPTION OF THE PREFERRED EMBODIMENTS

Preferred embodiments of an image recording method, an image transmitting method, and an image recording apparatus according to the present invention will be described below with reference to the drawings.

Figure 1:
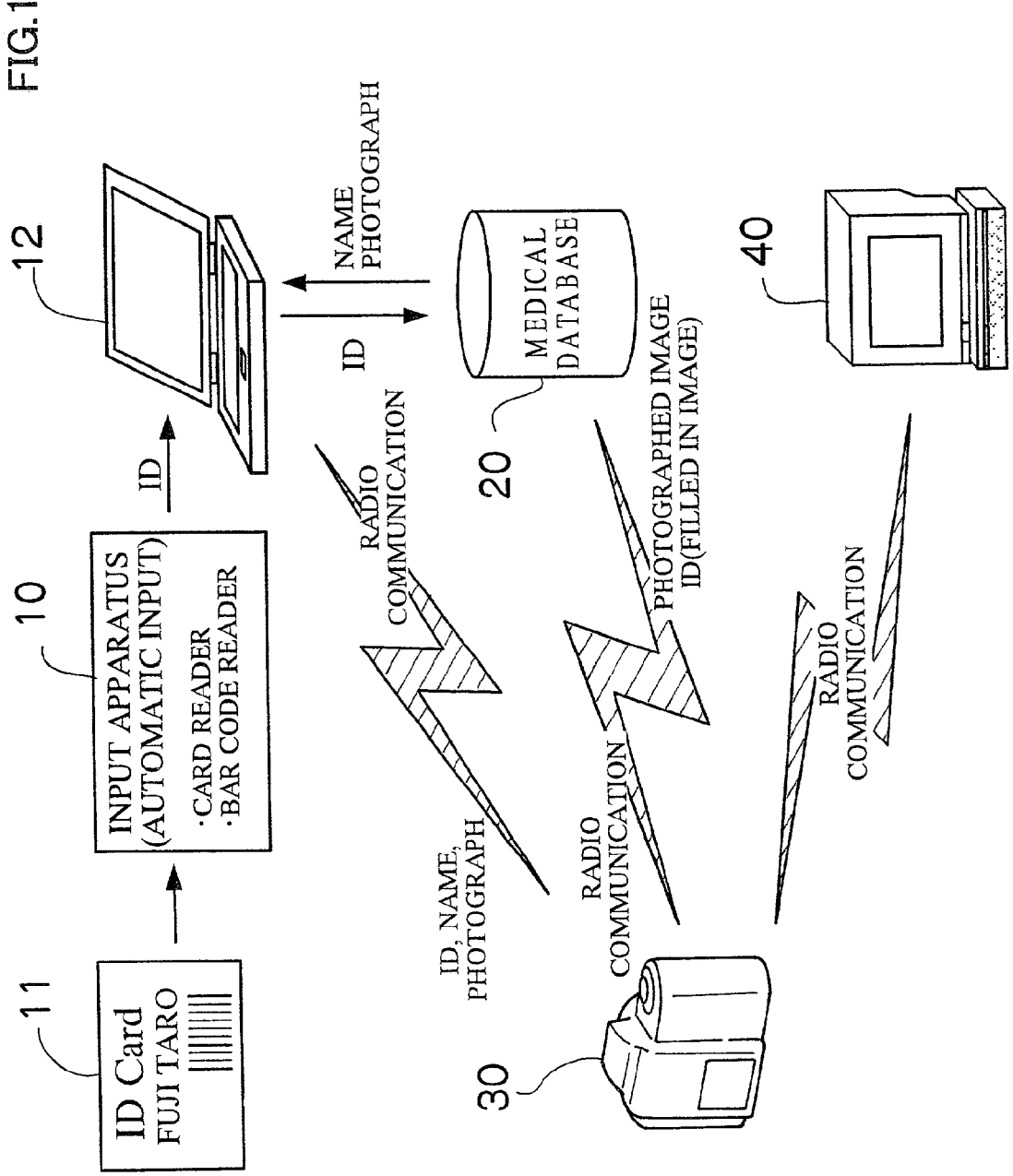
FIG. 1 is a view showing a system configuration for an image recording apparatus according to the present invention.

FIG. 1 is a view showing a system configuration for an image recording apparatus according to the present invention.

The system shown in this figure is applied to a medical system and is composed of an input device 10 such as a card reader or a bar code reader, a computer 12, a digital camera 30, and a medical database 20.

The input device 10 reads out a patient ID (number) from an ID card 11 having a bar code indicative of the patient ID recorded thereon, and transmits the ID to the computer 12. The ID card 11 is not limited to the card having the bar code recorded thereon, but may be another recording medium such as a magnetic card or an IC card.

The computer 12 reads out, from the medical database 20, patient information such as a photograph of the face of the corresponding patient or his or her name which is used to confirm the patient based on the patient ID input from the input device 10, and transmits the patient information to the digital camera 30 by radio communication together with the patient ID.

Figure 2:
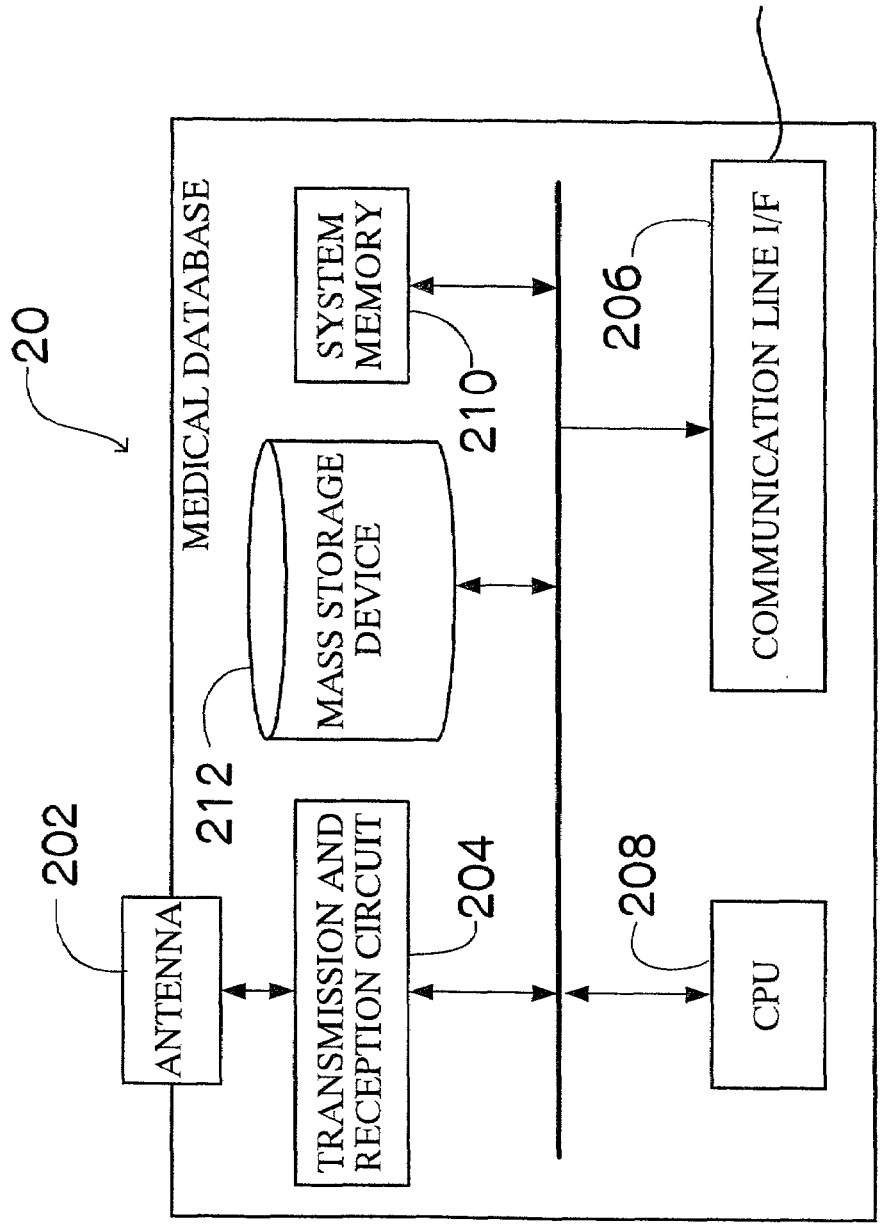
FIG. 2 is a block diagram showing the internal construction of the medical database shown in FIG. 1.

FIG. 2 is a block diagram showing the internal construction of the medical database 20.

As shown in this figure, the medical database 20 comprises an antenna 202 and a transmission and reception circuit 204 both of which are used to execute Bluetooth-conforming radio communication with the digital camera 30, a communication line I/F 206 which can transmit and receive required information such as patient IDs, photographs of their faces, and their names to and from the computer 12, a CPU 208 which controls the entire medical database 20, a system memory 210 composed of a ROM having programs, various constants, and others written thereto to operate the CPU 208 and a RAM used as a work area when the CPU 208 executes a process, and a mass storage device 212 having various data on each patient recorded thereon.

FIG. 3 shows an example of various information on patients arranged and managed on the basis of their IDs. The information shown in this figure is stored in the mass storage device 212 of the medical database 20 so as to be retrieved using patient IDs or the like.

Upon receiving a request for information on a patient and his or her ID from the computer 12 via the communication line I/F 206, the medical database 20 reads out a photograph of the patient's face and his or her name corresponding to the patient ID, from the mass storage device 212 on the basis of the patient ID, and returns these data to the computer 12. Further, the medical database 20 retains recorded image information such as the image format of images available in the database, the number of pixels in the image, compression rate, file size, and image aspect ratio, and transmits these pieces of information to the computer 12 together with the patient information.

The computer 12 transmits the patient ID input from the input device 10, the photograph of the patient's face and his or her name received from the medical database 20 on the basis of the patient ID, and the recorded image information, to the digital camera 30 by radio communication.

Figure 4:
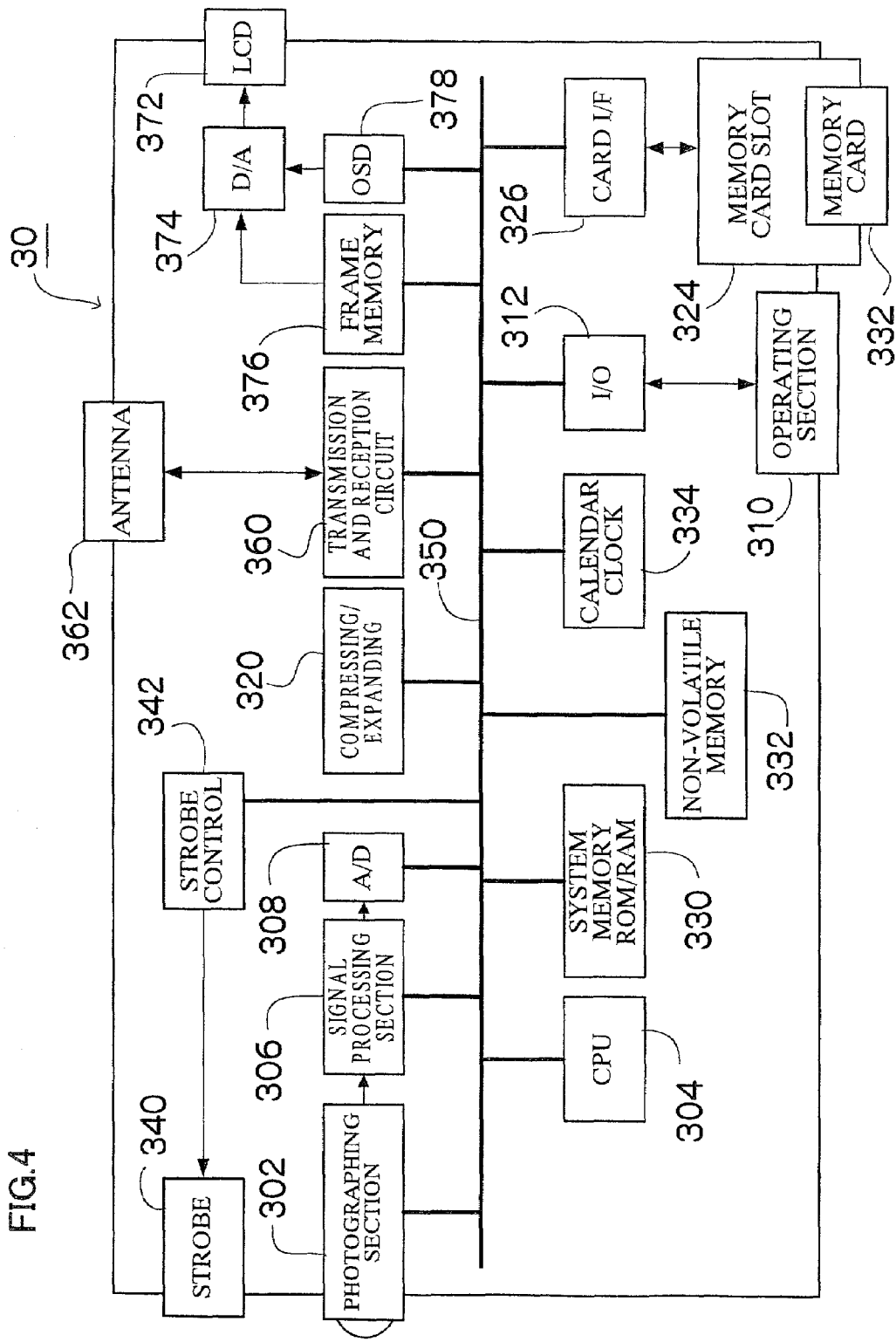
FIG. 4 is a block diagram showing the internal construction of the digital camera shown in FIG. 1.

FIG. 4 is a block diagram showing the internal construction of the digital camera 30. As shown in this figure, a photographing system of the digital camera 30 is provided with a photographing section 302 which forms an image of a subject on a light receiving surface for photoelectric conversion and outputs the image data obtained, a central processing unit (CPU) 304 which controls the entire digital camera 30 and also controls image data sampling timings, recording of image data, communication, display, generation of directories into which images are classified, and the like, a signal processing section 306 which executes white balance correction, gamma correction, and the like, and an A/D converter 308 which converts analog image signals into digital image data.

Further, an input system of the digital camera 30 is provided with an operating section 310 including a shutter button, a mode switching dial, a menu key, and a multi-function cross key, and an I/O port 312 which converts signals for various pieces of information input from the operating section 310.

Further, an image converting system of the digital camera 30 is provided with a compressing and expanding section 320 which controllably compresses image data by a method typified by JPEG or MPEG and which controllably expands the compressed data, and a card interface 326 which converts image data so that the data can be written to or read from a detachable memory card 322 via a card slot 324.

The CPU 304 has a memory 330 comprised of a ROM having operation programs and various constants stored therein and a RAM as a storage device which is used as a work area when any of the programs is executed and which allows images to be recorded therein, a non-volatile memory 332 as a storage device which can retain various constants and information relating to the operation of the digital camera 30 even during power interruption, a calendar clock 334 which manages photographed dates, and a strobe control device 342 which controls emissions from a strobe 340 emitting light to compensate for the insufficiency of the quantity of light for the subject during photographing, all these components connected to the CPU 304 via a bus 350.

The communication device of the digital camera 30, used to transmit and receive image data or the like to and from an external device by communication, is composed of a transmission and reception circuit 360 which allows the transmission and reception of information such as image data and patient information between the computer 12 and the medical database 20 and the image display device 40, and an antenna 362 which transmits and receives carrier waves and data.

A display system of the digital camera 30 is provided with a liquid crystal monitor 372, a D/A converter 374 which converts image data into a signal to be displayed on the liquid crystal monitor 372, a frame memory 376 composed of a VRAM or the like which temporarily stores images and information to be displayed, and an OSD 378 which displays characters such as names as well as messages on a screen.

Figure 5:
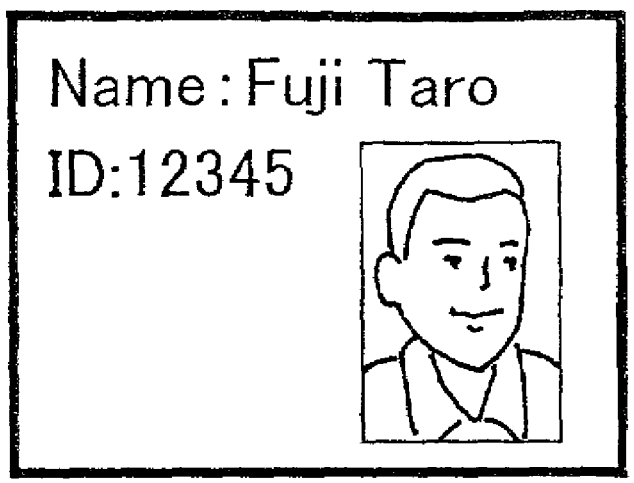
FIG. 5 is a view showing an example of patient information displayed on a liquid crystal monitor of the digital camera shown in FIG. 1.

The digital camera 30 constructed as described above displays a photograph of a patient's face and his or her name on the liquid crystal monitor 372 on the basis of patient information received from the computer 12. FIG. 5 shows an example of patient information displayed on the liquid crystal monitor 372.

The photographer confirms the patient as a subject on the basis of the photograph of the patient's face and his or her name displayed on the liquid crystal monitor 372, and then photographs the affected part of the patient using the digital camera 30. In recording the photographed image in an image file, the digital camera 30 records the patient ID in a header part of the image file. FIG. 6 shows the recorded structure of a JPEG image file. The digital camera 30 records the patient ID by filling it in an "APP 1" portion of the header part of the image file.

Subsequently, the digital camera 30 transmits the image file with the patient ID recorded in the header part thereof, to the medical database 20 and the image display device 40 by radio.

The digital camera 30 allows the recorded image information such as the image format, number of pixels, compression rate, file size, and image aspect ratio to be properly set. However, when the digital camera 30 receives recorded image information from the computer 12, the received image information is automatically set. A photographed image is recorded on the basis of the automatically set recorded image information. Further, in this embodiment, the recorded image information transmitted from the computer 12 is set in the digital camera 30, but the computer 12 may communicate with the digital camera 30 to obtain recorded image information which can be set in the digital camera 30 and may then select the optimum piece of recorded image information for an image to be handled by the medical database 20 and transmits this piece of information.

Figure 7:
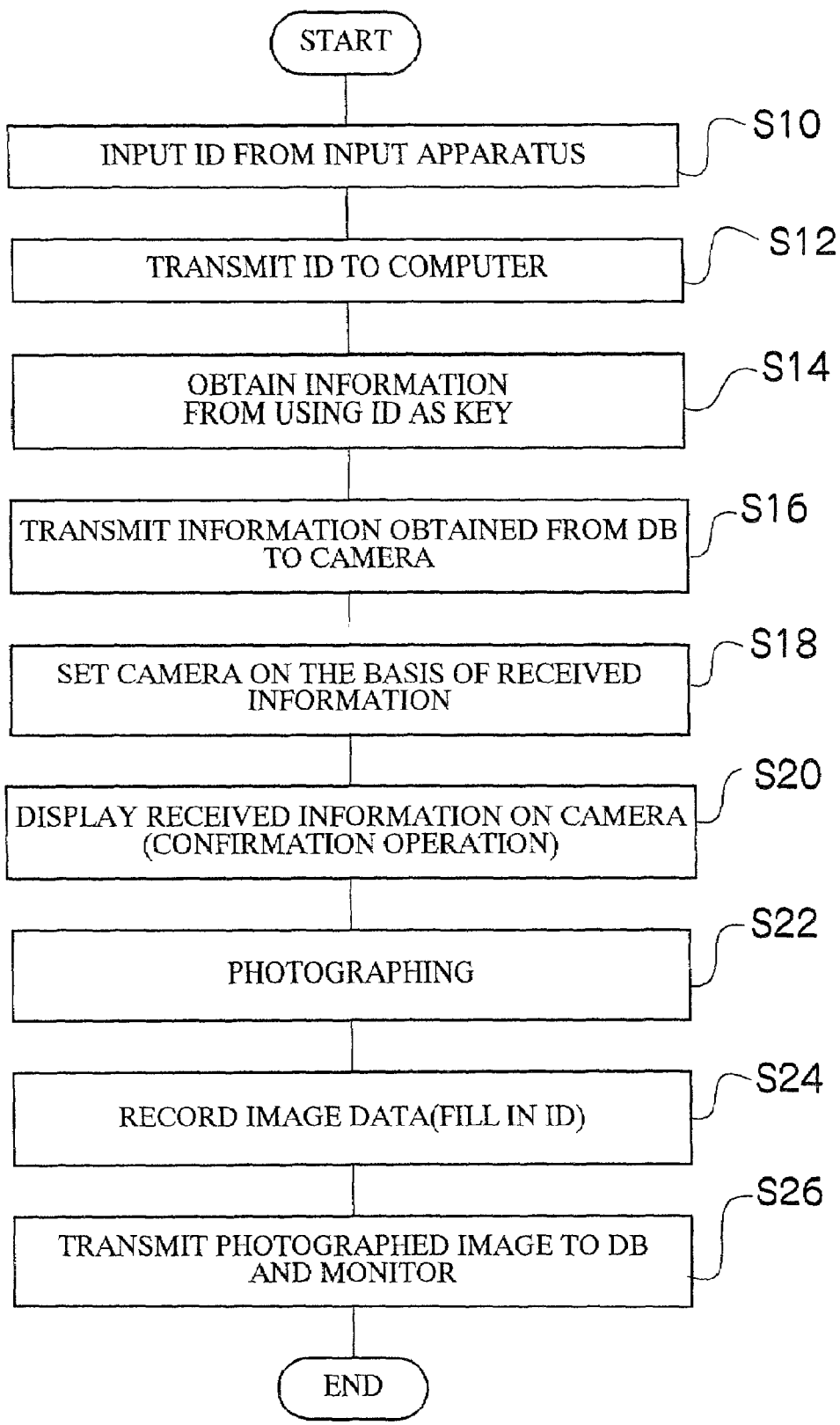
FIG. 7 is a flow chart used to describe an image recording method according to the present invention.

Now, an image recording method according to the present invention will be described with reference to the flow chart shown in FIG. 7.

First, the input device 10 installed at a reception desk reads the patient's ID card 11 to obtain a patient ID (step S10). The patient ID input to the input device 10 is transmitted to the computer 12 (step S 12).

The computer 12 obtains patient information and recorded image information from the medical database 20 using the patient ID as a key, and then transmits these pieces of information to the digital camera 30 together with the patient ID (steps S14 and S16).

The digital camera 30 automatically sets the image format, number of pixels, compression rate, and others on the basis of the received recorded image information (step S18), and displays a photograph of the patient's face and his or her name on the liquid crystal monitor of the camera on the basis of the received patient information to confirm the patient as a subject (step S20).

After the confirmation has been completed, the digital camera 30 photographs the affected part of the patient (step S22). While the digital camera 30 is receiving information such as the patient ID and patient information, it is prohibited from photographing and is allowed to do it after the reception has been completed.

In recording the photographed image in an image file, the digital camera 30 fills the patient ID obtained in a header part of the image file together with the patient information (step S24). Thus, the patient confirmed on the liquid crystal monitor and the patient ID filled in the header part of the file for the patient's photographed image are associated with each other.

Subsequently, the digital camera 30 transmits the image file with the patient ID recorded in the header part, to the medical database 20 and the image display device 40 by radio (step S26). The image communicated by radio is automatically registered in the medical database 20 on the basis of the patient ID.

In this embodiment, when the patient ID is input via the ID card 11, the computer 12 immediately transmits the patient ID and the information obtained from the medical database, to the digital camera 30. However, the computer 12 may accumulate patient IDs input via the input device 10, in order of input so that whenever the appropriate switch of the digital camera 30 is operated to transmit a request for information such as a patient ID or patient information to the computer 12, the computer 12 can transmit the corresponding information in order of input.

Further, an ID card with a patient ID, patient information, and the like recorded thereon may be used so that the input device 10 can read the patient ID and patient information from the ID card and transmit the read information directly to the digital camera 30. In this case, neither the computer 12 nor the medical database 20 is required.

Furthermore, in this embodiment, the patient information used to confirm the patient on the liquid crystal monitor comprises a photograph of the patient's face and his or her name, but other information may be used as long as it allows the patient to be ascertained.

Moreover, in this embodiment, the image recording method and apparatus according to the present invention is applied to a medical system, and the subject is the affected part or the like of the patient. However, the present invention is not limited to this aspect but is applicable to photographing of a person, a product, or the like. If the subject is a product, it can be confirmed by displaying a photograph or the name of this product.

Figure 8:
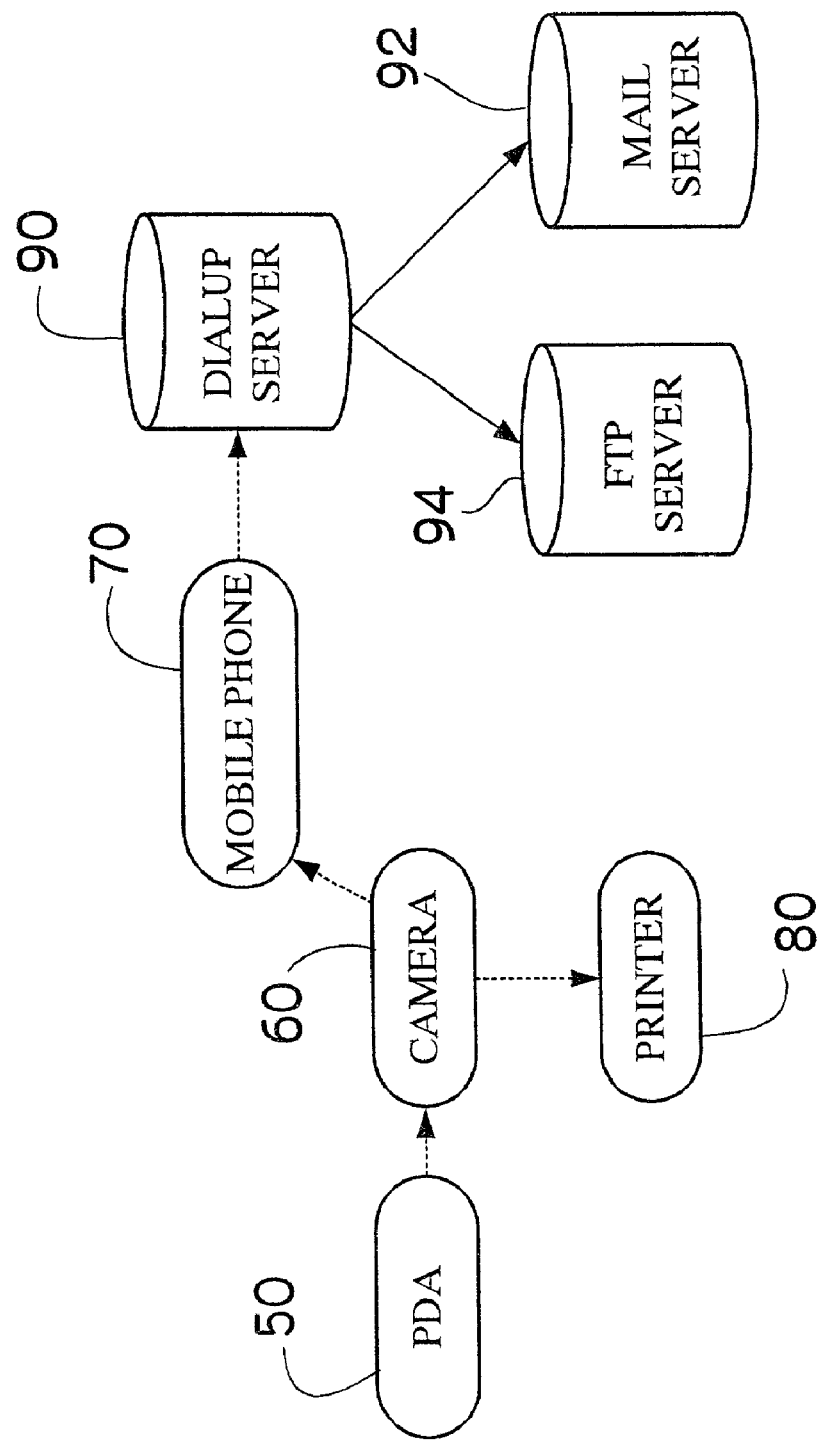
FIG. 8 is a view showing a system configuration for an image transmitting method according to the present invention.

FIG. 8 shows a system configuration for an image transmitting method according to the present invention.

The system in this figure is composed of a personal digital assistant (PDA) 50, a digital camera 60, a mobile phone 70 to which an image from the digital camera is transmitted, and a printer 80. The image transmitted to the mobile phone 70 is transmitted to a main server 92 and an FTP (File Transfer Protocol) server 94 via a dial-up server 90 as described above.

The PDA 50 has personal information on the photographer, destination information on the destination of images, and the like recorded therein. The personal information includes the photographer's address, name, telephone number, and age, and the destination information includes the telephone number, PPP (Point-to-point Protocol) telephone number, PPP account, PPP password, and electronic mail address of the mobile phone 70, and the address, mail account, mail password, FTP server address, FTP account, and FTP password of a mail server. Further, the PDA 50 has a communication function of communicating with the digital camera 60 to transmit information to be recorded in a header portion of an image photographed using the digital camera 60 and data on a position of the header at which the information is to be recorded.

The digital camera 60 is constructed in the same manner as the digital camera 30 shown in FIG. 4. The digital camera 60 communicates with the PDA 50 by radio to receive the destination information or the like from the PDA 50 and fills it in the header portion of the image file for the photographed image. FIG. 9 shows an example of recorded header names and recorded values in a header part of an image file.

The mobile phone 70 has a communication device which communicates with a public telephone line by radio and a communication device which executes Bluetooth-conforming radio communication with the digital camera 60 so that information such as an image received from the digital camera 60 can be transmitted to a dial-up server 90 through dial-up connection.

The mobile phone 70 can be connected to the dial-up server 90 via a dial-up operation, and information received from the mobile phone 70 is transmitted to the mail server 92 and the FTP server 94.

Figure 10:
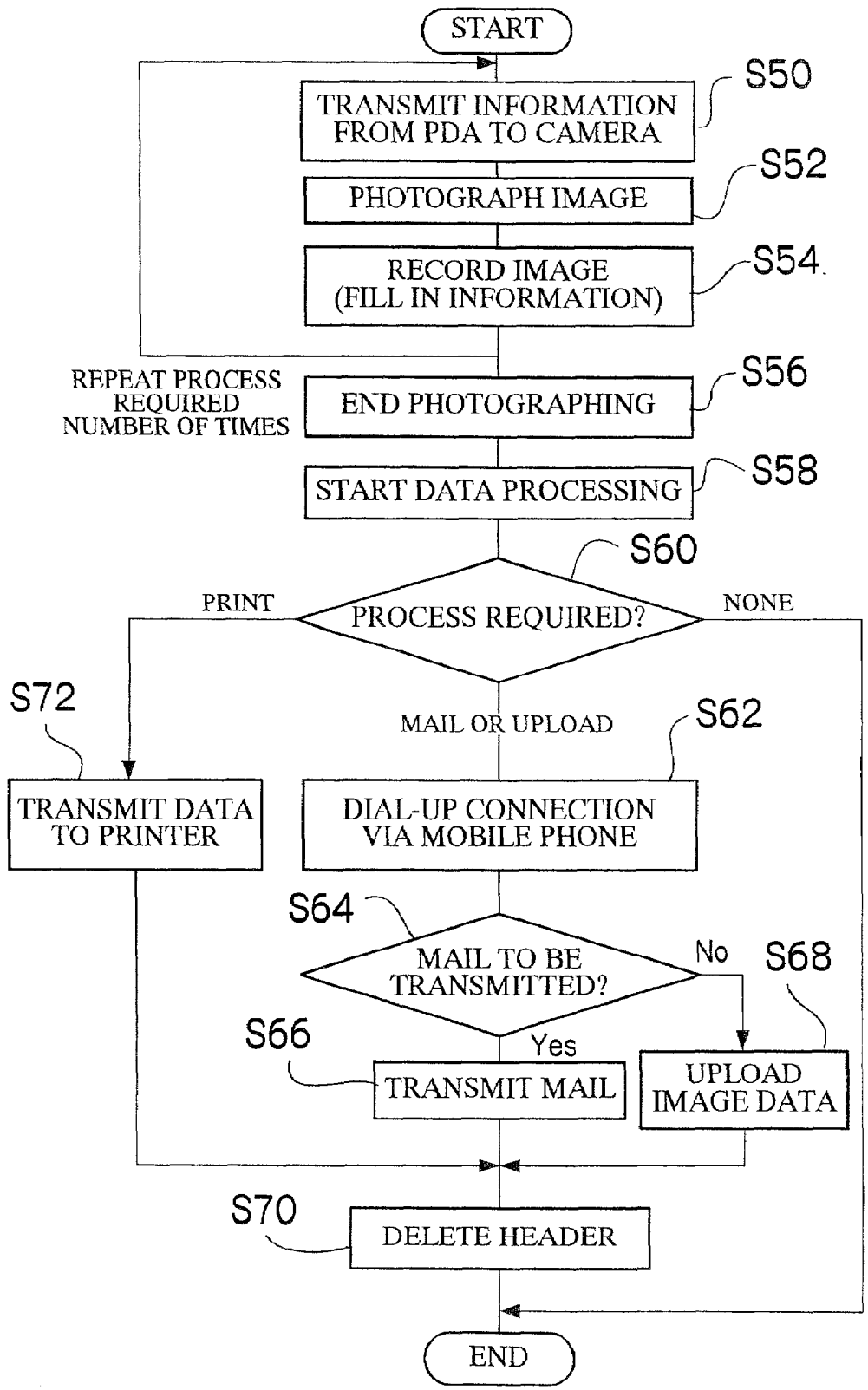
FIG. 10 is a flow chart used to describe an image transmitting method according to the present invention.

Now, an image transmitting method according to the present invention will be described with reference to the flow chart in FIG. 10.

First, the PDA 50 specifies destination information indicative of that portion of a header part of an image file in which an image photographed using the digital camera 60 is filled, as well as personal information and other information, and then transmits these pieces of information to the digital camera 60 (step S50).

The non-volatile memory in the PDA 50 has one or more pieces of destination information so that specified destination information can be properly transmitted to the digital camera 60. Further, the device which notifies the digital camera 60 of information to be filled in the photographed image is not limited to the PDA 50 but may be another external device.

Next, the digital camera 60 photographs and records an image to be transmitted, and fills the received information in a specified position of the image file for the image (step S54). The process from steps S50 to S54 is repeated a required number of times.

Once the photographing with the digital camera 60 has been completed, the camera is switched from a photographing mode to an image data processing mode (steps S56 and S58).

When switched to the image data processing mode, the digital camera 60 automatically detect what is recorded in the header part of the photographed image, and execute the transmission of an electronic mail, the uploading of data in a server, print output, and other processes depending on the recorded contents (step S60).

If the header part contains the following information:
Mobile-phone
PPP-TEL
PPP-Account
PPP-Password
e-mail then the digital camera 60 connects to the dial-up server 90 via the mobile phone 70 using a dial-up operation for transmission of e-mail or uploading to a server (step S62). The digital camera and the mobile phone communicate data with each other by radio. The "Mobile-phone" number enables the determination of the mobile phone with which the digital camera communicates. The telephone number, account, and password for the dial-up operation correspond to the recorded values of "PPP-TEL", "PPP-Account", and "PPP-Password", respectively (see FIG. 9).

If the header part contains the following information:
Mail-Server
Mail-Account
Mail-Password then an electronic mail is transmitted using image data as an attached file (step S66). The mail server, account, and password for mail transmissions correspond to the recorded values of "Mail-Server", "Mail-Account", and "Mail-Password", respectively (see FIG. 9).

On the other hand, if the header part contains the following information:
FTP-Server
FTP-Account
FTP-Password then the image data is uploaded in the server in accordance with the FTP. The FTP destination, account, and password correspond to the recorded values of "FTP-Server", "FTP-Account", and "FTP-Password", respectively (see FIG. 9).

Once the transmission in step S66 or S68 is completed, the dial-up connection is cleared, and the digital camera 60 deletes the header, related to the transmission, from the transmitted image (step S70) to complete the process.

On the other hand, if the "Printer" header contains a recorded value (information on the printer at the destination) as shown in FIG. 9, the process proceeds from step S60 to step S72. At step S72, the digital camera 60 transmits image data to the printer 80 by radio. After transmitting the image data to the printer 80, the digital camera 60 deletes the header from the image data (step S70) to complete the process.

The destination information, which is indicative of the destination of the photographed image, is not limited to that shown in FIG. 9 but may be other information. In short, it has only to be used to automatically transmit the photographed image to the desired destination. Further, information such as the size of sheets to be printed and specified print resolution or personal information which does not relate to processing on the image data may be filled together with the destination information. Furthermore, the printing and transmission of the image data and other processes may be executed for each image data or a plurality of images may be processed together. Alternatively, if plural pieces of destination information are input to the digital camera, the photographed image may be simultaneously transmitted to a plurality of destinations on the basis of the plural pieces of destination information.

Further, the PDA transmits the destination and other information, which is filled in the image, to the camera, but the camera may request the PDA to transmit the information. This request may be issued whenever the photographer performs a required operation or during photographing (that is, when the shutter button is operated or the photographing mode is set). Furthermore, in this embodiment, the camera transmits the information via the mobile phone, but the order of transmission may be the camera PDA, mobile phone, and server or the camera, PDA, and server.

In this embodiment, the header is removed after the transmission of the image has been completed, it need not be removed. Alternatively, the image file may be deleted after the transmission of the image has been completed. Furthermore, in this embodiment, the camera interprets the information filled in the header to process the image data. However, a recording medium having the image file recorded thereon may be taken out from the camera and the data may be processed using other device such as a personal computer.

As described above, according to the present invention, when the subject identification information is recorded in the photographed image of the subject in connection therewith, the identification information is read from the recording medium such as a card to automatically load, in the digital camera, the subject identification information and the subject information used by the photographer to confirm the subject. Accordingly, the subject identification information can be easily input, and no manual inputs are required, thereby preventing input errors. Further, the subject information loaded in the digital camera is displayed on the display device of the digital camera. Consequently, the photographer can confirm the subject on the basis of the displayed subject information before photographing the subject, thereby exactly associating an image of the subject with the subject identification information.

Further, the digital camera, which allows the recorded image information such as the image format, number of pixels, compression rate, file size, and image aspect ratio to be set, records the photographed image on the basis of externally loaded recorded image information. Consequently, the image can be recorded in a format suitable for an image database as the destination of the image.

Furthermore, according to the present invention, the image destination information is loaded from the external device, thereby enabling the photographed image to be automatically transmitted to the destination corresponding to the destination information.

Now, a preferred embodiment of an image recording method and system according to the present invention will be described.

Figure 11:
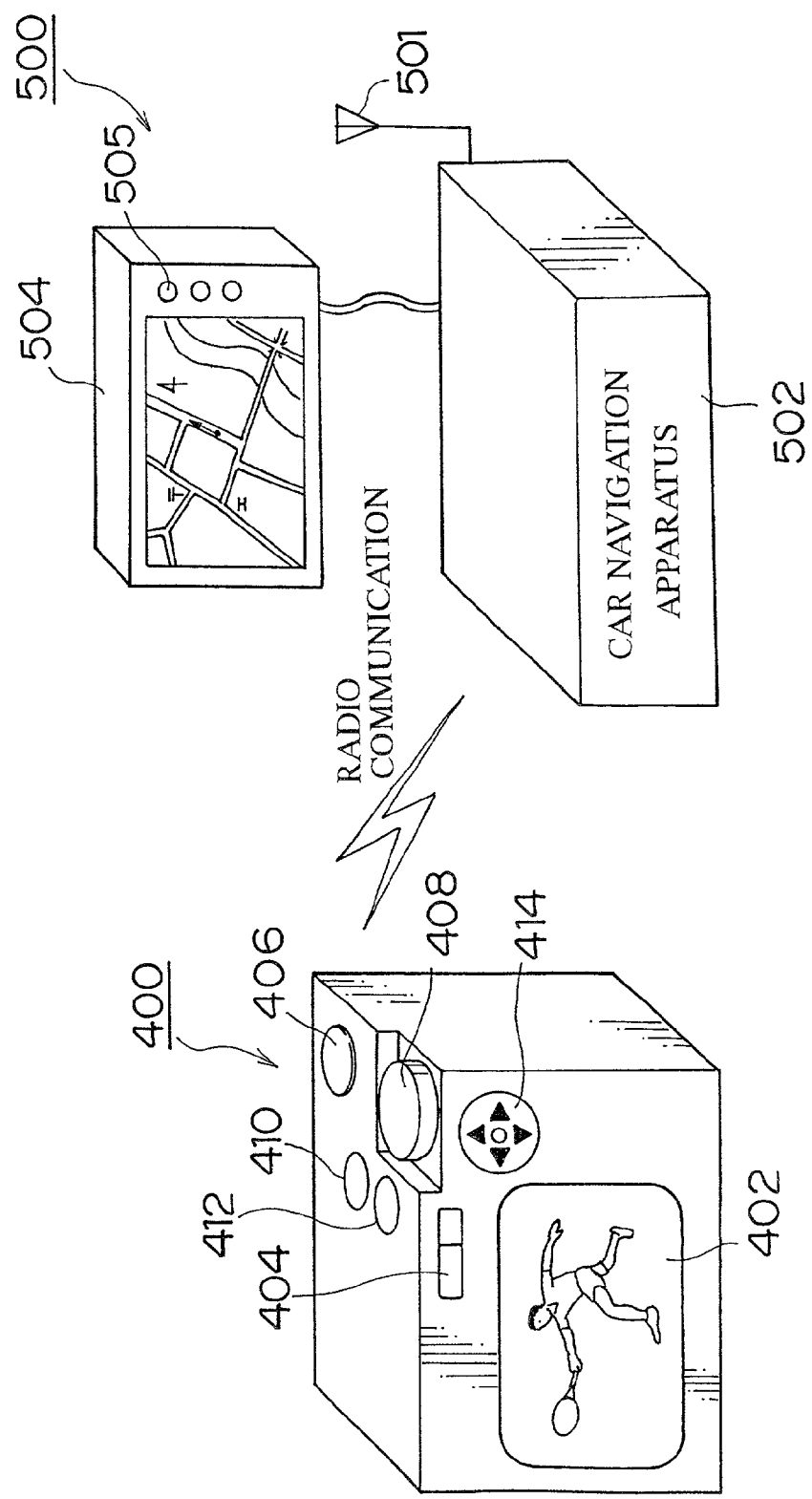
FIG. 11 is a schematic view showing an image recording system according to the present invention.

FIG. 11 is a schematic view showing an embodiment of the image recording system according to the present invention.

The image recording system shown in this figure is composed of a digital camera 400 and an external device (in the embodiment, a car navigation apparatus) 500 which provides the digital camera 400 with added-to-image information added to an image of the subject as well as display information.

The digital camera 400 is provided with an operating section including a liquid crystal monitor 402, a power switch 404, a release button 406, a mode setting dial 408, an erase button 410 which erases images, a setting button 412 which sets photographing conditions and print and various other items and updates added-to-image information (for example, GPS information) according to the present invention, an up, down, right, and left button 414, and other buttons.

Figure 12:
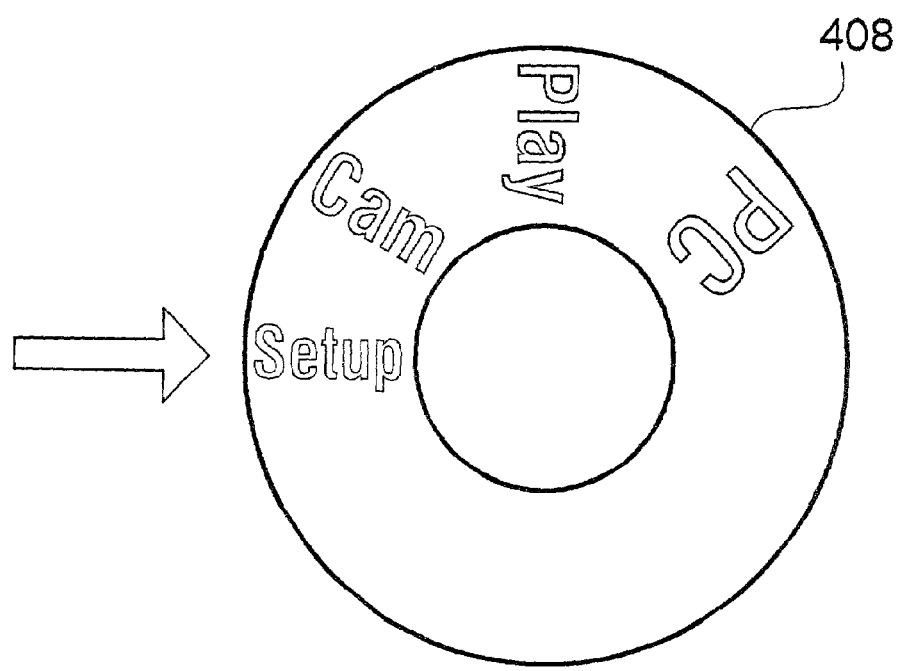
FIG. 12 is a view showing the display of various modes provided on a mode setting dial.

The mode setting dial 408 sets various modes for the digital camera 400, that is, sets any of a setup mode (Setup), a photographing mode (Cam), a play mode (Play), and a connection mode (PC) in which connection to a personal computer or the like is established as shown in FIG. 12.

Further, the car navigation apparatus 500 is composed of a car navigation apparatus main body 502 having a GPS antenna 501, a map database (not shown), and others, and of a liquid crystal monitor 504.

The digital camera 400 and the car navigation apparatus main body 502 each have a built-in antenna (not shown) for radio communication (for example, Bluetooth-conforming short-distance radio communication). The car navigation apparatus main body 502 transmits added-to-image information and display information to the digital camera 400 by radio.

The added-to-image information transmitted from the car navigation apparatus main body 502 is GPS information representative of latitude, longitude, and altitude. The display information contains texts such as a place name and tourist information as well as an image such as a map, all these pieces of information being read out from the map database on the basis of the GPS information.

Upon receiving the added-to-image information and display information from the car navigation apparatus main body 502 in the setup mode, the digital camera 400 displays the display information on the liquid crystal monitor 402 of the digital camera 400. In this regard, the added-to-image information may be displayed on the liquid crystal monitor 402 together with the display information.

On the basis of the display information (a place name, a map, and the like) displayed in the monitor 402, the photographer can determine whether the correct GPS information has been obtained for the photographed location. That is, if only the GPS information is displayed, it cannot be intuitively understood whether or nor the GPS information is representative of the photographed location. However, with a place name and the like displayed, it can be understood whether or not the place name and the like correspond to the photographed location.

Subsequently, when the digital camera 400 is switched to the photographing mode and the release button 406 is operated to photograph the subject, the image of the subject is recorded on the recording medium such as a memory card in a file format. At this time, the added-to-image information (GPS information) obtained during photographing is recorded in the header part of the image file. The display information such as a place name is used to recognize added-to-image information added to the subject image and is not recorded in the header part of the image file.

Figure 13:
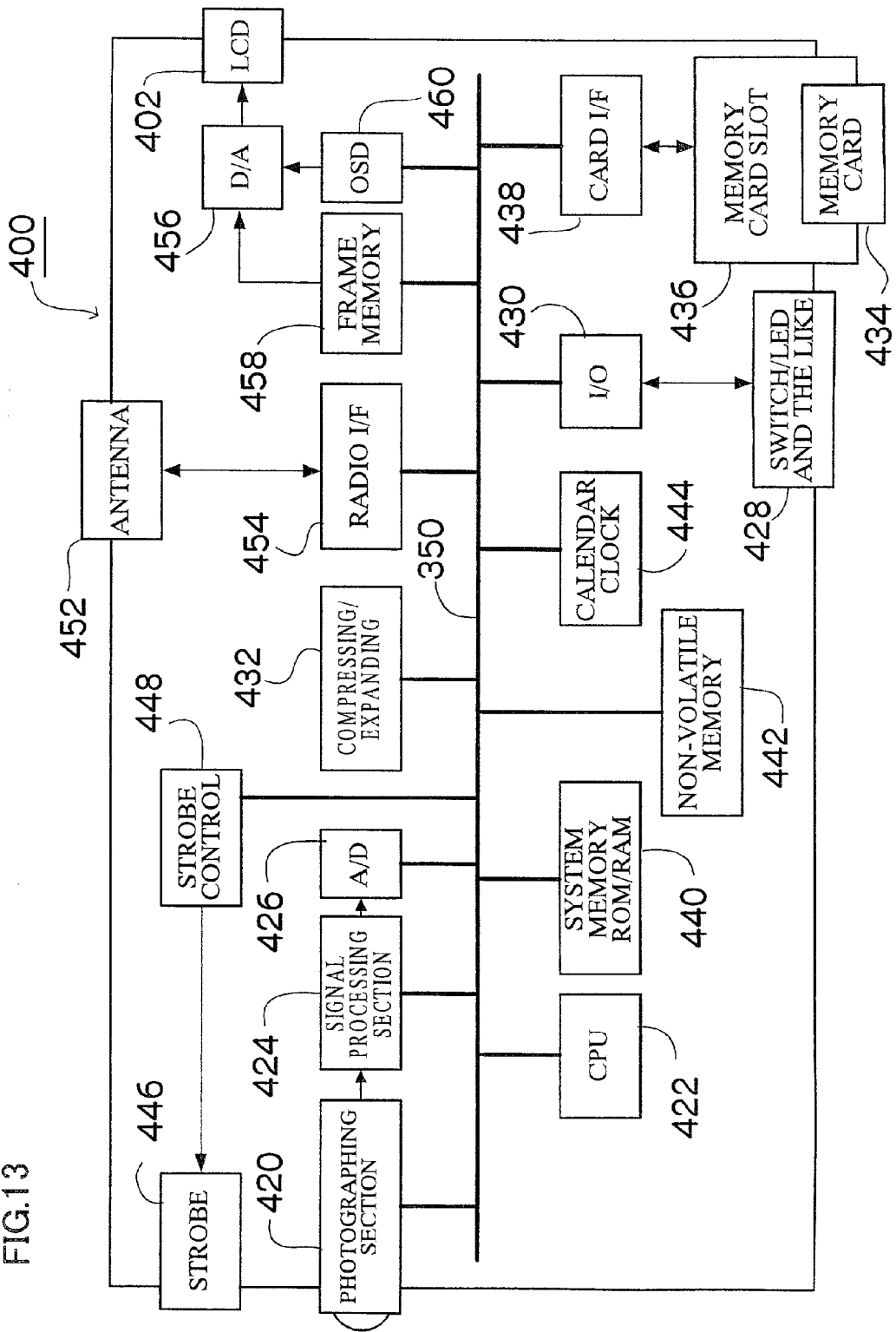
FIG. 13 is a block diagram showing the internal construction of the digital camera shown in FIG. 11.

FIG. 13 is a block diagram showing the internal construction of the digital camera 400.

As shown in this figure, a photographing system of the digital camera 400 is provided with a photographing section 420 which forms an image of the subject on a light receiving surface for photoelectric conversion and outputs the image signal obtained, a central processing unit (CPU) 422 which controls the entire digital camera and also controls sampling of image signals, recording of images, communication, display, generation of directories into which images are classified, and the like, a signal processing section 424 which executes white balance correction, gamma correction, and the like, and an A/D converter 426 which converts analog image signals into digital image data.

Further, an input system of the digital camera 400 is provided with an operating section 428 including the power switch 404, release button 406, mode setting dial 408, setting button 412, and up, down, right, and left button 414 shown in FIG. 11, and an I/O port 430 which converts signals for various pieces of information input from the operating section 428.

Further, an image converting system of the digital camera 400 is provided with a compressing and expanding section 432 which controllably compresses image data by a method typified by JPEG or MPEG and which controllably expands the compressed data, and a card interface 438 which converts image data so that the data can be written to or read from a detachable memory card 434 via a card slot 436.

The CPU 422 has a memory 440 comprised of a ROM having operation programs and various constants stored therein and a RAM as a storage device which is used as a work area when any of the programs is executed and which allows images to be recorded therein, a non-volatile memory 442 as a storage device which can retain various constants and information relating to the operation of the digital camera 400 even during power interruption, a calendar clock 444 which manages photographed dates, and a strobe control device 448 which controls emissions from a strobe 446 emitting light to compensate for the insufficiency of the quantity of light for the subject during photographing, all these components connected to the CPU 422 via a bus 450.

The communication device of the digital camera 400 is composed of a built-in antenna 452 which receives the added-to-image information and display information from the car navigation apparatus 500, and a radio interface 454.

A display system of the digital camera 400 is provided with a liquid crystal monitor 402, a D/A converter 456 which converts an image into a signal to be displayed on the liquid crystal monitor 402, a frame memory 458 composed of a VRAM or the like which temporarily stores images and information to be displayed, and an OSD 460 which displays characters such as names as well as messages on a screen.

Figure 14:
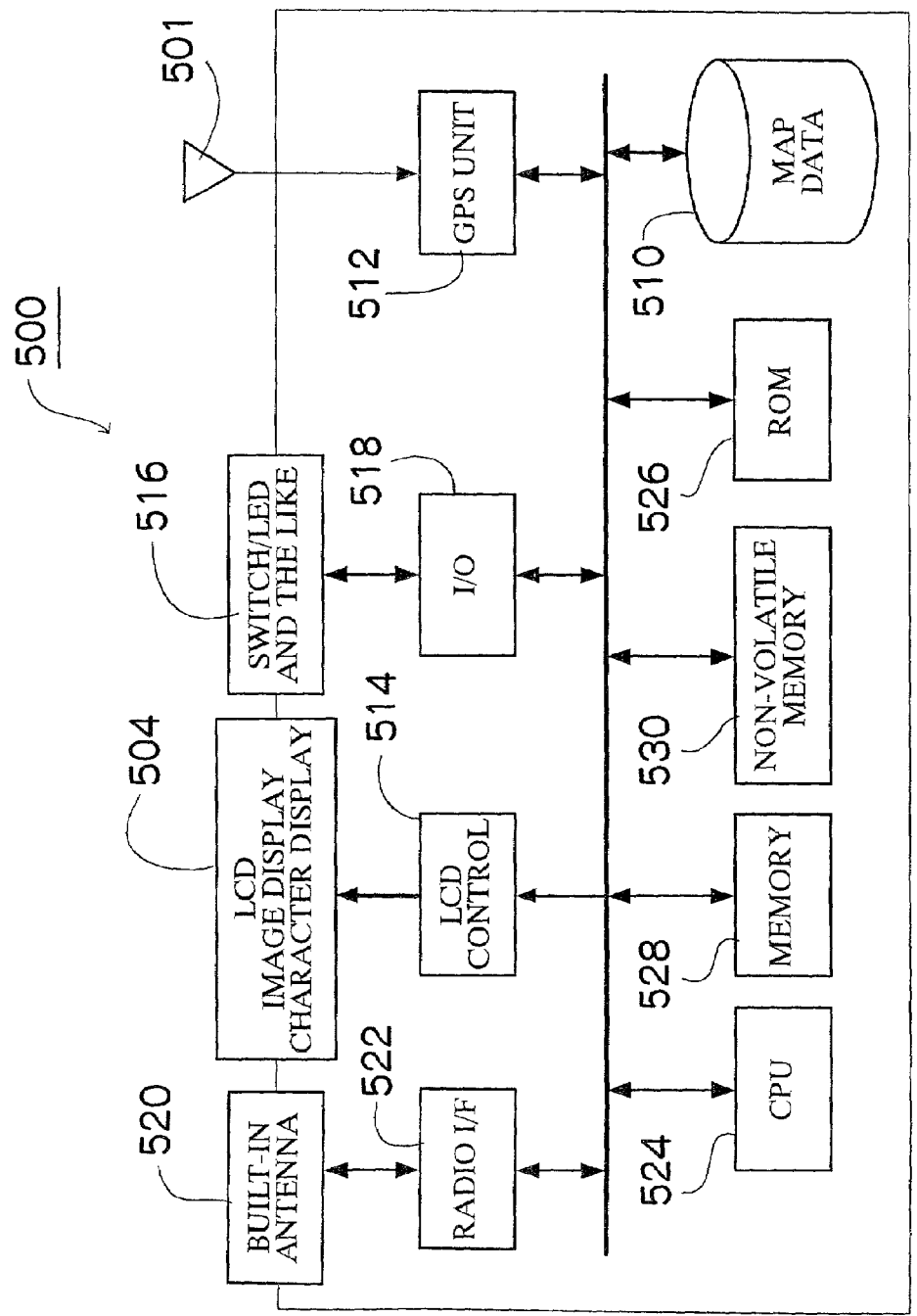
FIG. 14 is a block diagram showing the internal construction of the car navigation apparatus shown in FIG. 11.

FIG. 14 is a block diagram showing the internal construction of the car navigation apparatus 500.

As shown in this figure, the car navigation apparatus 500 is provided with a map database 510 such as a CD-ROM which has map information recorded thereon and including image information such as maps and text information such as the names of places and tourist information, and is also provided with a GPS unit 512.

The GPS unit 512 is connected to a GPS antenna 501 attached to, for example, a rear window of a vehicle. The GPS antenna 501 captures electric waves transmitted from a plurality of artificial satellites (not shown) for the GPS, and outputs the electric waves to the GPS unit 512. The GPS unit 512 demodulates the electric waves input from the GPS antenna 501, and measures the current latitude, longitude, altitude, and the like of the vehicle on the basis of the demodulated signals.

The car navigation apparatus 500 reads out the map information from the map database 510 on the basis of GPS information such as the current latitude, longitude, and the like of the vehicle measured as described above, and outputs the information to the liquid crystal monitor 504 via the liquid crystal control circuit 514 to display a map, while displaying, on the map, a mark or the like which is indicative of the current location of the vehicle.

The liquid crystal monitor 504 has an operating section 516 including a power switch 505, a menu selecting switch, and a switch used to set a destination on a liquid crystal screen as shown in FIG. 11, and information input from the operating section 516 is input to the car navigation apparatus 500 via an I/O port 518.

Further, the car navigation apparatus 500 is provided with a built-in antenna 220 and radio interface 222 both of which are used to execute Bluetooth-conforming radio communication with the digital camera 400, a CPU 224 which integrally controls each section of the car navigation apparatus 500, a ROM 226 having operation programs and various constants for operating the CPU 224 stored therein, a memory 228 used as a work area when the CPU 224 executes a process, and a non-volatile memory 230 as a storage device which can retain various constants and information relating to the operation of the car navigation apparatus 500 even during power interruption.

Now, the positional information transmitted from the car navigation apparatus 500 to the digital camera 400 will be described.

Figure 15:
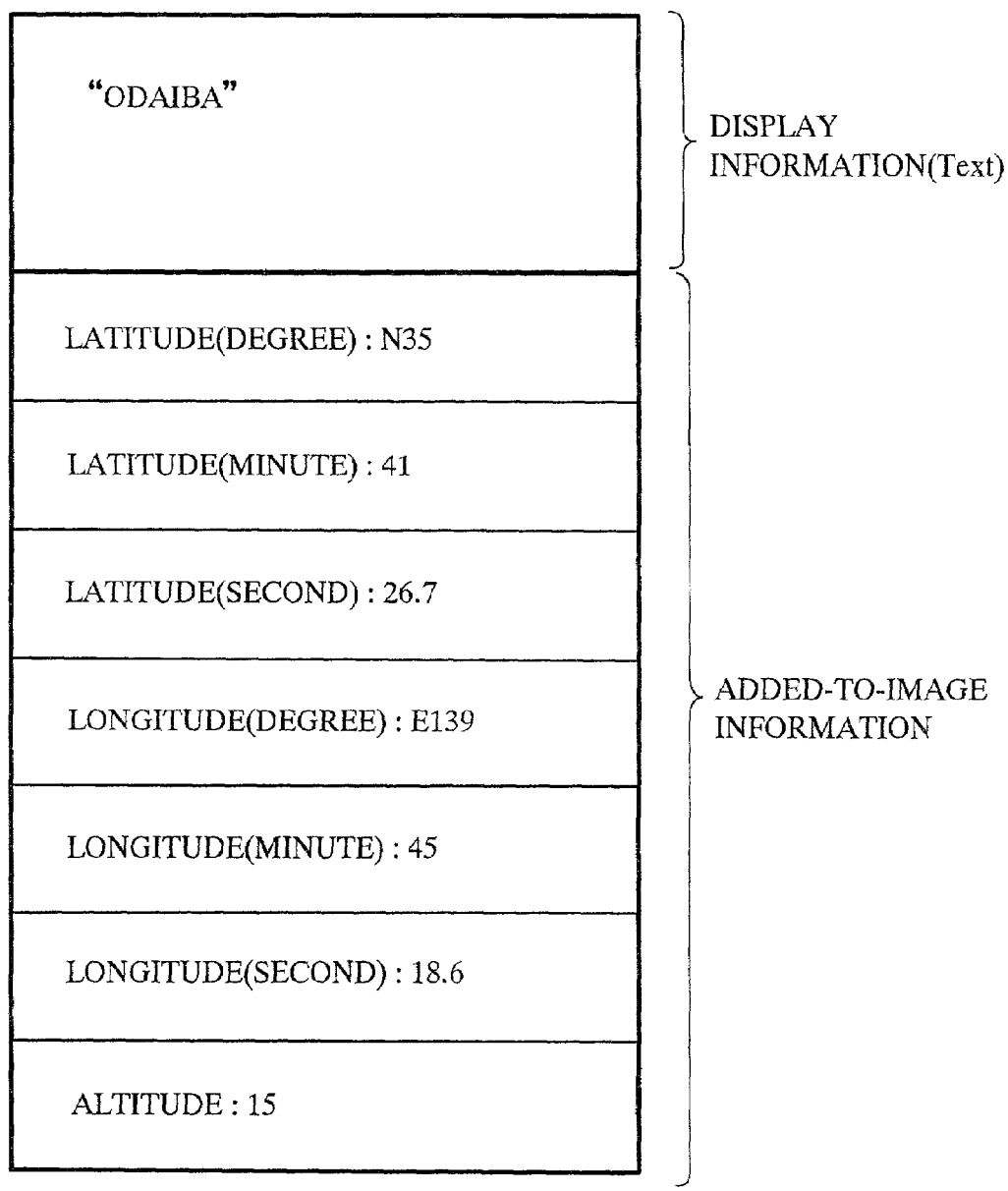
FIG. 15 is a view showing the contents of display information and added-to-image information received by the digital camera from the car navigation apparatus.

This positional information has a data structure classified into display information and added-to-image information as shown in FIG. 15. The display information is a text information which can be displayed by the OSD 460 of the digital camera 400, and contains characters the number of which is equal to or smaller than the value with which the information can be displayed on the liquid crystal monitor 402 of the digital camera 400. Further, the added-to-image information is binary information representative of numerical values for latitude, longitude (degree/minute/second), and altitude (m). GPS information obtained by the GPS unit 512 is used directly as added-to-image information.

In the embodiment shown in FIG. 15, the display information is a text information relating to the place name "Odaiba", and the added-to-image information is GPS information representative of the latitude, longitude, and altitude of "Odaiba".

FIG. 16 shows the structure of an image file with added-to-image information attached thereto and which has been received from the car navigation apparatus 500.

As shown in this figure, the image file has a main image, a thumbnail image, and added-to-image information (Tag information). The digital camera 400 reads out the added-to-image information from the non-volatile memory 442 during photographing, the added-to-image information being contained in the positional information received from the car navigation apparatus 500. The digital camera 400 then adds this added-to-image information (Tag information) to the image file.

FIGS. 17 and 18 show examples of screens displayed on the liquid crystal monitor 402 of the digital camera 400 in the setup mode. Specifically, FIGS. 17 and 18 show screens displayed before and after the positional information stored in the non-volatile memory 442 of the digital camera 400 is updated, respectively.

As shown in FIG. 17, before the update, the positional information "Harumi" is stored in the non-volatile memory 442, and "Harumi" is displayed as display information.

Then, when the up, down, right, and left button 414 is used to select "Locational Information" (the corresponding portion is reversely displayed) and the setting button 412 is depressed, new locational information is obtained from the car navigation apparatus 500 for update.

Once the locational information has been updated, the display information of the updated locational information is displayed on the liquid crystal monitor 402. In FIG. 18, the display "Locational Information" has been changed from "Harumi" to "Odaiba".

If the locational information has not been received or is unavailable, "Locational Information" is not displayed or "Unknown" or the like is displayed.

Next, the operation of the digital camera 400 and car navigation apparatus 500 during update of the locational information will be described.

Figure 19:
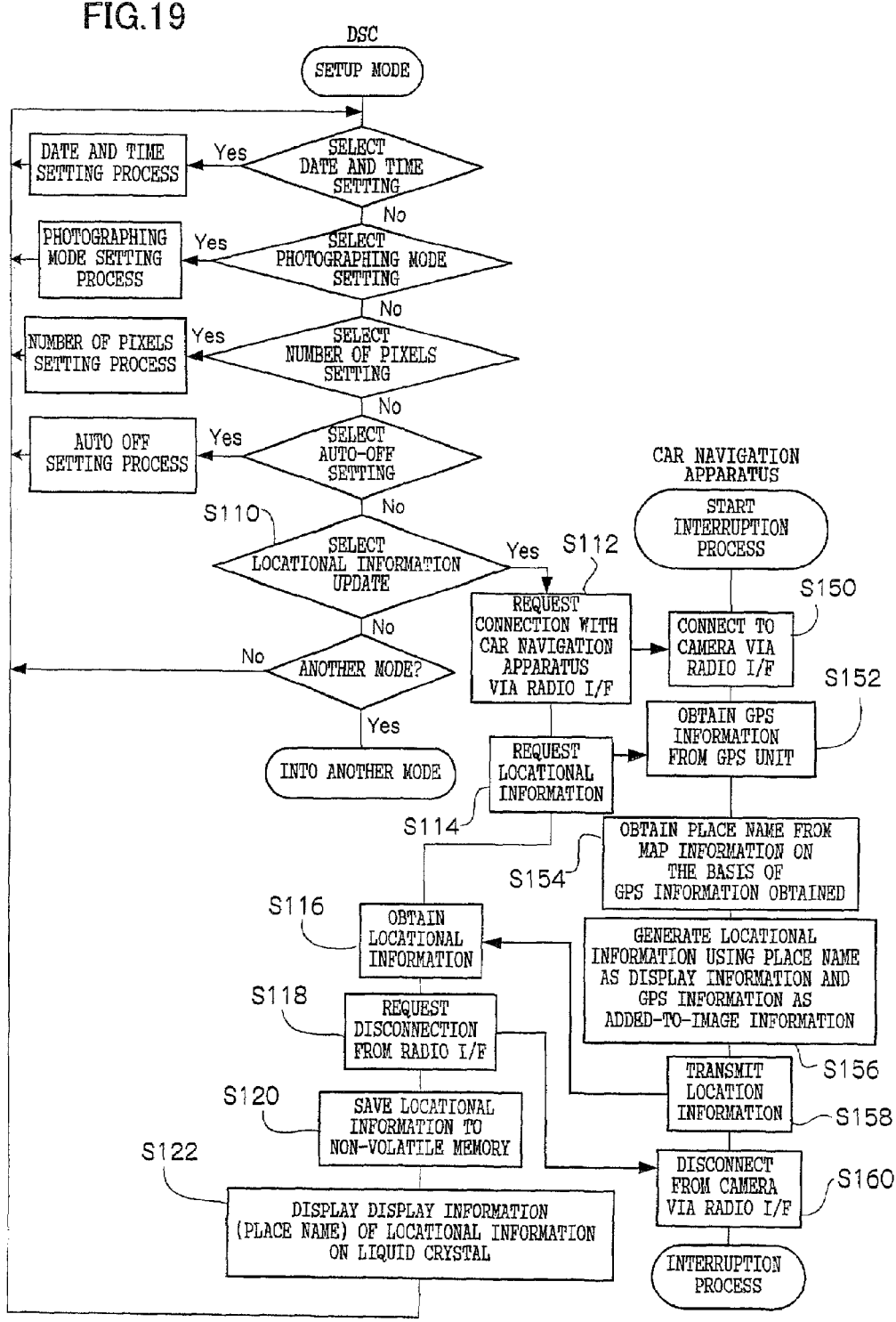
FIG. 19 is a flow chart used to describe the operation of the digital camera and car navigation apparatus performed when the positional information is updated.

As shown in the flow chart in FIG. 19, when the digital camera 400 is set in the setup mode, date and time setting, photographing mode setting, number of pixels setting, auto-off setting, or locational-information update setting is selected, so that a setting process is executed for each of the selected setting modes.

When the up, down, right, and left button 414 is operated to select "Locational Information" on the setup screen and the setting button 412 is depressed to set the locational information to be updated (step S110), the digital camera 400 requests, via a radio communication I/F, the car navigation apparatus 500 to connect thereto (step S112). Upon receiving a connection request from the radio communication I/F, the car navigation apparatus 500 starts an interruption process to connect to the digital camera for communication (step S150).

Once the communication is established, the digital camera 400 requests locational information from the car navigation apparatus 500 (step S114). Upon receiving this request, the car navigation apparatus 500 obtains GPS information from the GPS unit 512 (step S152).

Subsequently, on the basis of the GPS information obtained, the car navigation apparatus obtains a place name corresponding to the GPS information, from the map database 510 as text information. The car navigation apparatus uses this text information as a display information, that is, the place name, to generate locational information containing the GPS information as added-to-image information (step S156). The thus generated locational information is transmitted to the digital camera 400 (step S158).

Upon receiving the locational information from the car navigation apparatus 500 (step S116), the digital camera 400 requests, via the radio communication I/F, the car navigation apparatus 500 to disconnect therefrom. Upon receiving the disconnection request from the radio communication I/F, the car navigation apparatus 500 disconnects from the digital camera to end the interruption process (step S160).

Further, the digital camera 400, after requesting, via the radio communication I/F, the car navigation apparatus 500 to disconnect therefrom, updates the locational information stored in the non-volatile memory 442 using the locational information obtained from the car navigation apparatus 500. By storing the locational information in the non-volatile memory 442, this information is retained in spite of the frequent turn-on and -off of the power supply to the camera.

The display information is read out from the locational information stored in the non-volatile memory 442, and is displayed on the liquid crystal monitor 402 (step S122).

Thus, the photographer can check whether or not the place name displayed on the setup screen (FIGS. 17 and 18) before photographing matches the photographed location. If the place name does not match the photographed location, it is assumed that the locational information has not been updated, so that it is updated.

In this embodiment, the digital camera 400 obtains the locational information from the car navigation apparatus 500 by short-distance radio communication. However, the present invention is not limited to this aspect, but the locational information may be obtained online or via the memory card. Further, the display information displayed on the liquid crystal monitor 402 may be a map displayed on the liquid crystal monitor 504 of the car navigation apparatus 500.

Now, the operation of the digital camera 400 during photographing will be described.

Figure 20:
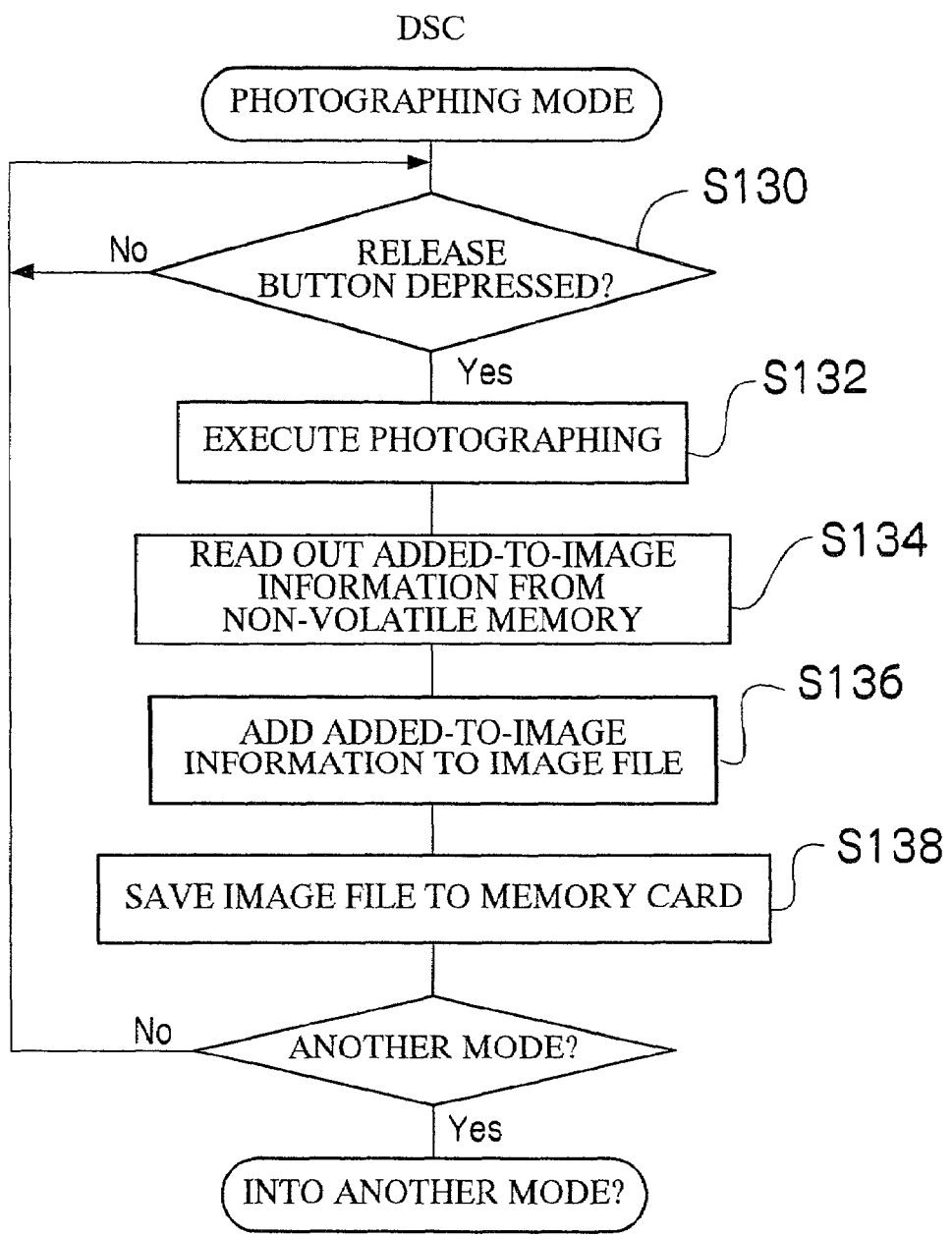
FIG. 20 is a flow chart used to describe the operation of the digital camera during photographing.

As shown in the flow chart in FIG. 20, when the digital camera 400 is set in the photographing mode and the release button 406 is depressed (step S130), photographing is carried out. Image data on the subject obtained by this photographing session is JPEG-compressed, while a thumbnail image is created from this image data (step S132). Subsequently, the added-to-image information (GPS information) is read out from the locational information stored in the non-volatile memory 442 (step S134), and is added to the JPEG-compressed image data to generate an image file (step S136). The thus generated image file is stored in the memory card 434 (step S138).

If it has been confirmed from the setup screen that no locational information has been set in the non-volatile memory 442 or unavailable information has been recorded therein, hexadecimal FFFF, indicative of unavailability, is recorded in each tag for the added-to-image information in the image file, or no tags are recorded.

To determine whether or not the locational information is available, reception time may also be stored when the locational information is stored in the non-volatile memory 442 so that the locational information can be determined to be available if this time is within a specified range from the photographed time.

Now, other embodiments of the added-to-image information and display information will be described.

In the embodiment shown in FIG. 15, the added-to-image information is GPS information and the display information is a place name, but the relationship between the added-to-image information and the display information is not limited to this aspect. For example, for digital camera used in hospitals or the like, patient information (display information and added-to-image information) such as that shown in FIG. 21 is used.

That is, the display information displayed on the camera contains a thumbnail image of a subject (a photograph of the patient's face) to be photographed and the text information of identification information on the patient, and the added-to-image information contains the binary information of the patient ID, the name of the consulting department (ID of the consulting department), the photographed part, and the disease name. The display information may be the text information of the subject name (patient name).

Figure 21:
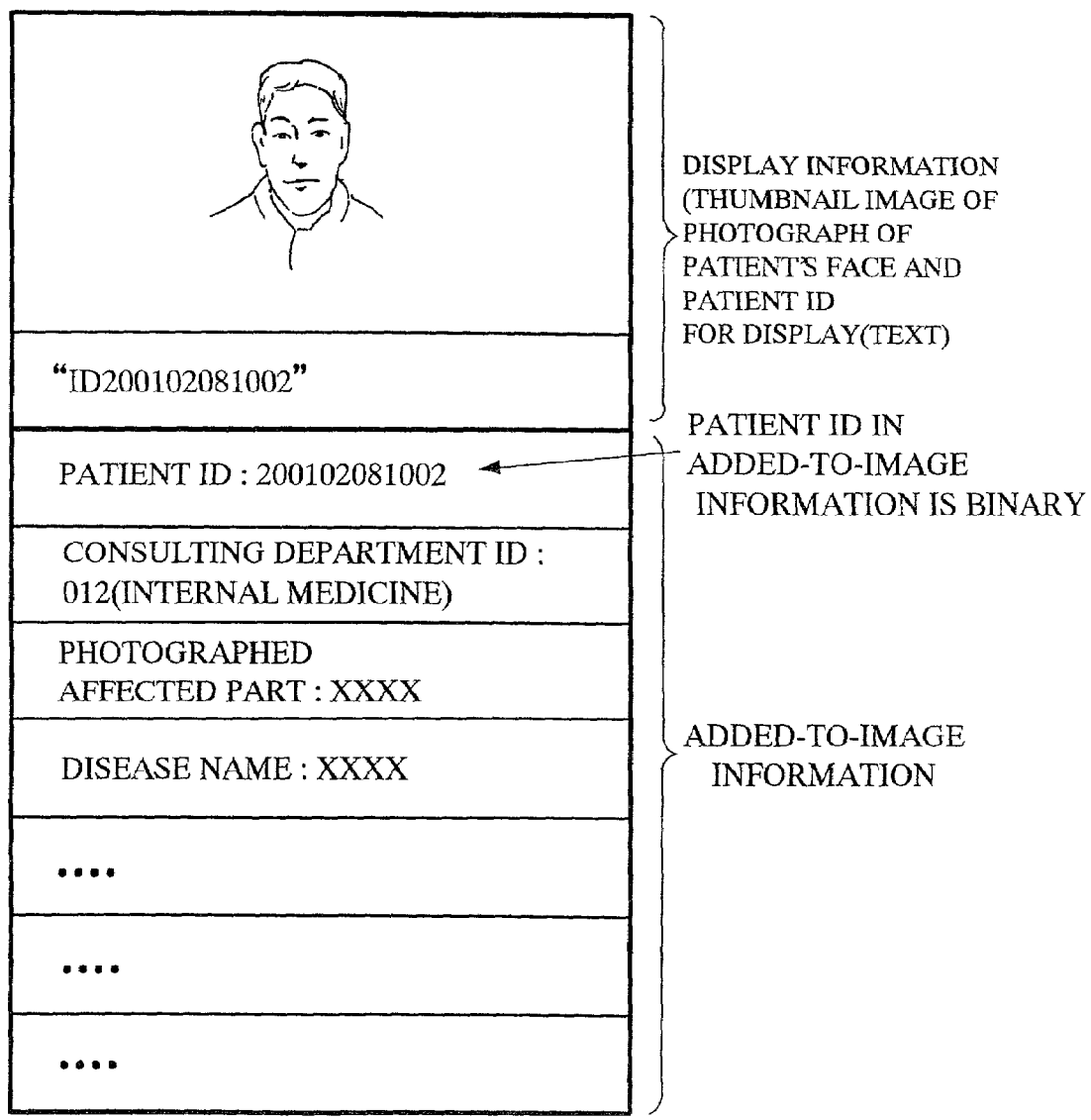
FIG. 21 is a view showing the contents and data structure of display information and added-to-image information received by a digital camera of a hospital from an external device.

The patient information shown in FIG. 21 is transmitted to the digital camera in the following manner:

A card reader reads the patient information shown in FIG. 21, from a patient card such as an IC card having this patient information recorded thereon, and then transmits it to the digital camera by radio or online.

Alternatively, the patient ID is read from the patient card having this patient ID recorded thereon, and is then input to a personal computer. The personal computer, to which the patient ID has been input, reads out the corresponding thumbnail image of a photograph of the patient's face and required added-to-image information from a patient database having various information on the patient recorded therein, on the basis of the input patient ID, and then transmits these pieces of patient information to the digital camera.

Figure 22:
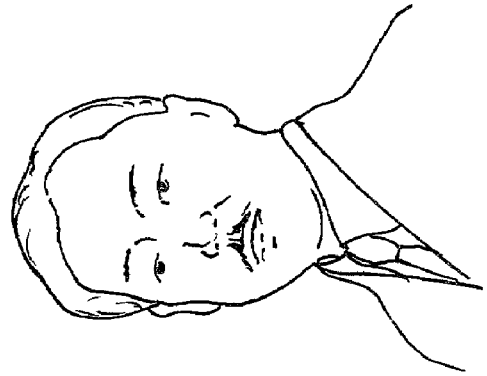
FIG. 22 is a view showing an example of a monitor screen of the camera, displaying display information and others before patient information is updated.
Figure 23:
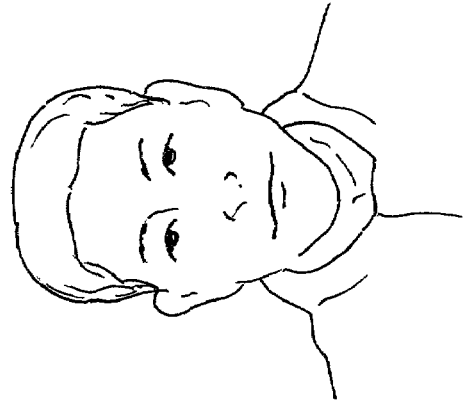
FIG. 23 is a view showing an example of the monitor screen of the camera, displaying display information and others after the patient information has been updated.

FIG. 22 shows the monitor screen of the camera before the patient information is updated, and FIG. 23 shows the monitor screen of the camera after the added-to-image information and display information have been updated (to the information shown in FIG. 21).

As shown in FIGS. 22 and 23, a practitioner can confirm the patient to be photographed on the basis of the display information (the photograph of the patient's face and the patient ID as text information) of the patient information displayed on the monitor screen of the digital camera. As a result, the photographed image of the patient can be exactly associated with added-to-image information to be added to this image.

In this regard, the external device transmitting the added-to-image information and display information to the digital camera is not limited to this embodiment, but may be, for example, a personal digital assistant or a mobile phone. Further, the added-to-image information and display information transmitted to the digital camera are not limited to this embodiment.

Furthermore, in this embodiment, the display information is displayed on the setup screen of the digital camera. However, the display information may be overlaid on the subject image (animated image) already displayed on the monitor screen, in the photographing mode or may be displayed on a character liquid crystal.

Alternatively, the display information, together with the added-to-image information, may be recorded in connection with the image so that when the image is reproduced on the camera, the information can be simultaneously displayed. For example, the binary GPS information and textual place name information ("Odaiba") may be stored in the image file so that "Odaiba" can be displayed when the image file is reproduced.

As described above, according to the present invention, when the added-to-image information is loaded from the external device and recorded in connection with the photographed image, the display information relating to the added-to-image information and which can be recognized by the photographer is displayed on the display device of the camera together with the added-to-image information. Therefore, it can be easily checked what added-to-image information is added and whether or not the added-to-image information is correct as information to be added to the subject image.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image recording method, comprising:
    loading identification information of a value or a binary information preliminary added to a subject and subject information used by a photographer to confirm an identity of the subject, in a digital camera before photographing the subject;
    displaying, on a basis of the subject information, subject information used by the photographer to confirm the identity of the subject on a display device of the digital camera before photographing the subject;
    photographing the subject using the digital camera after confirming the identity of the subject on the basis of the subject information displayed on the display device; and
    recording a photographed medical image of the subject in connection with the loaded identification information,
        wherein the photographed medical image recorded in connection with the loaded identification information is saved to a database,
        wherein the identification information loading comprises:
            reading a subject identification information from a recording medium having the subject identification information recorded thereon;
            reading the subject information corresponding to the read subject identification information from the recording medium, from a database having the subject information already stored in connection with the subject identification information; and transmitting the subject information read from the database, to the digital camera together with the identification information read from the recording medium, wherein the subject information comprises an image of a face from the subject's image and name, and wherein the recording records the identification information loaded in the information loading, in a header part of an image file in which the photographed medical image of the subject is recorded wherein, while the subject identification information and the subject information are being transmitted to the digital camera, the digital camera inhibited from photographing the subject.

2. The image recording method according to claim 1, wherein:

reading the identification information reads plural pieces of identification information so that these pieces can be accumulated; and the transmitting transmits the identification information and the subject information in response to an information obtainment request from the digital camera.

3. The image recording method according to claim 1, wherein:

the information loading loads recorded image information containing at least one of image format, the number of pixels, compression rate, file size, and image aspect ratio; and the digital camera records the photographed medical image on a basis of the loaded recorded image information.

4. The image recording method according to claim 1, wherein said information loading comprises loading said identification information in the digital camera using radio communication.

5. The image recording method according to claim 1, wherein said information loading automatically loads the identification information on the subject and the subject information used by the photographer to confirm the subject, in the digital camera before photographing the subject.

6. The image recording method according to claim 1, wherein the recording further comprises transmitting the recorded photographed medical image, together with the identification information in the header part of the image file, to a data base and an image display device by a radio from the digital camera, after said confirming the identity of the subject, and after said photographing the subject.

7. An image recording apparatus, comprising: p1 an input device which reads identification information of a value or a binary information preliminary added to a subject from a recording medium having the information recorded thereon;

an information transmitting device which reads subject information corresponding to the read identification information, from a database having the subject information already stored in connection with a subject identification information and transmits the subject information read from the database, together with the identification information read from the recording medium, wherein said subject information comprises information of an image of a face from the subject's image and a name of the subject;

a receiving device which receives the identification information and the subject information;

a display device which displays the subject information on the basis of the received subject information before photographing the subject;

a photographing device which photographs the subject; and a recording device which records a photographed medical image of the subject in connection with the received identification information, wherein the recording device records the identification information in a header part of an image file in which the photographed medical image of the subject is recorded, and wherein, when the information transmitting device transmits subject identification information and the subject information, the device is inhibited from photographing the subject.

8. The image recording apparatus according to claim 7, wherein the recording medium comprises one of a card, a magnetic card, and an IC card including a bar code recorded thereon, and the input device comprises a card reader.

9. The image recording apparatus according to claim 7, further comprising a communication device which transmits the image recorded in connection with the identification information, to the database.

10. An image recording apparatus, comprising:

an input device which reads an identification information of a value or a binary information preliminary added to a subject and subject information from a recording medium having the identification information and the subject information recorded thereon, wherein said subject information comprises information of an image of a face from the subject's image and a name of the subject;

a display device which displays the subject information on the basis of the read subject information before photographing the subject;

a photographing device which photographs the subject; and a recording device which records a photographed medical image of the subject in connection with the read identification information, wherein the recording device records the identification information in a header part of an image file in which the photographed medical image of the subject is recorded, and wherein, while the identification information and the subject information are being read by the input device, the photographing device is inhibited from photographing the subject.

11. The image recording apparatus according to claim 10, wherein the recording medium comprises one of a card, a magnetic card, and an IC card including a bar code recorded thereon, and the input device comprises a card reader.

12. The image recording apparatus according to claim 10, further comprising a communication device which transmits the medical image recorded in connection with the identification information, to the database.

* * * * *